United States Patent
Hanzawa

(10) Patent No.: US 6,996,341 B2
(45) Date of Patent: Feb. 7, 2006

(54) PHOTOGRAPHIC APPARATUS FOR STEREOSCOPIC MICROSCOPE

(75) Inventor: Toyoharu Hanzawa, Mitaka (JP)

(73) Assignee: Olympus Corporation, Tokyo (JP)

( * ) Notice: Subject to any disclaimer, the term of this patent is extended or adjusted under 35 U.S.C. 154(b) by 159 days.

(21) Appl. No.: 10/664,009

(22) Filed: Sep. 17, 2003

(65) Prior Publication Data

US 2004/0091259 A1    May 13, 2004

(30) Foreign Application Priority Data

Sep. 19, 2002   (JP) .............................. 2002-272596

(51) Int. Cl.
*G02B 21/36*   (2006.01)
(52) U.S. Cl. ...................... 396/432; 348/79
(58) Field of Classification Search ................ 396/14, 396/17, 18, 432; 348/79
See application file for complete search history.

(56) References Cited

U.S. PATENT DOCUMENTS 4,143,938 A * 3/1979 Feinbloom .............. 359/363
4,801,197 A * 1/1989 Minami .................... 359/861
5,264,928 A * 11/1993 Howes ...................... 348/79

FOREIGN PATENT DOCUMENTS

JP    H11-84263    3/1999

* cited by examiner

*Primary Examiner*—David M. Gray
(74) *Attorney, Agent, or Firm*—Arnold International; Bruce Y. Arnold

(57) ABSTRACT

A photographic apparatus is disclosed for use with a stereoscopic microscope having at least two observation light paths for obtaining at least two images having parallax, with the photographic apparatus guiding a light flux that has been split from one of the observation optical paths. The photographic apparatus includes: a connecting part that may be connected to the stereoscopic microscope; at least two image pickup elements, each having an image receiving surface; a beam splitter positioned in an optical path between the connecting part and the at least two image receiving surfaces; and an image relay optical system in each light flux following the beam splitter. Each image relay optical system relays an intermediate image that is formed in each light flux following the beam splitter to a respective one of the at least two image receiving surfaces.

16 Claims, 24 Drawing Sheets

PHOTOGRAPHIC APPARATUS FOR STEREOSCOPIC MICROSCOPE

This application claims the benefit of priority of JP 2002-272596, the subject matter of which is hereby incorporated by reference.

BACKGROUND OF THE INVENTION

When observing with a microscope, there are times when it is necessary to photograph the observed object. This need is especially great, for example, in the production of semiconductors or in the treatment of affected areas during surgery. In such cases, the use of a stereoscopic microscope that performs three-dimensional observations is common. Furthermore, since it is desirable to be able to connect either a device that records a still picture or a device that records moving pictures to a stereoscopic microscope, the ability to attach either of these two types of recording devices is required. Of these two types, since a high quality image recording device having a wide dynamic range and high resolution is desired for recording still pictures, either a large CCD with a high pixel count or photographic film is commonly used. For recording moving pictures, the required resolution is typically not as high as for recording still pictures; thus, a smaller CCD with less resolution is commonly used.

A stereoscopic microscope is normally formed of an objective lens for substantially collimating a light flux from an object, two afocal zooming optical systems, optical path splitter means for splitting the light fluxes that exit the afocal zooming optical systems into at least one observation system light flux and a photographic system light flux, a binocular tube optical system, and eyepiece lenses for forming magnified images of the observation light flux for viewing. By attaching a stand together with an imaging device to such a stereoscopic microscope, an apparatus that allows viewing as well as photography is achieved.

For a stereoscopic microscope that is to be used for production or medical treatment, it is preferred to have the parts that are near to the observed object be as small as possible. Furthermore, it is preferred that the stereoscopic microscope have the ability to move freely in relation to the stand. In order to accomplish this, the stereoscopic microscope must be made as light as possible so as to enable it to move easily. In addition, the photographic apparatus must be installed to a part of the stand that is separate from the stereoscopic microscope.

In order to arrange the stereoscopic microscope and the photographic apparatus separate from each other, it becomes necessary to lengthen the optical path of the optical system of the photographic apparatus, and it often becomes necessary to provide various attachment positions for multiple image detecting (i.e., photographic) devices by using things such as reflection members. Such an optical system has already been proposed in Japanese Laid-Open Patent Application H11-84263, which provides for an intermediate image plane within a common optical path for the optical systems of the two image detecting devices. However, this design results in the following problems.

When the sizes of the image planes of the two image detecting devices differ greatly, the magnification difference of the optical systems placed between the intermediate image and each of the image planes increases. This places unreasonable demands on the layout of the optical system, thereby resulting in the deterioration of the optical performance which, in turn, necessitates an increase in the number of lens elements needed to maintain satisfactory optical performance.

In order to make the size of an intermediate image that is suited to either a large, high-resolution CCD or a small CCD of less resolution, the magnification of the intermediate image needs to be limited. In conjunction with this, restrictions in the distance settings occur in the imaging device after splitting the light flux so as to provide two optical paths, and the acceptable locations for the placement of the imaging device become greatly diminished. This makes it difficult to arrange the photographing device so that it is located at a position separate from the imaging device so as to enable the observer to make observations while simultaneously working on the object being viewed.

BRIEF SUMMARY OF THE INVENTION

The present invention relates to a photographic apparatus suitable for attachment to a stereoscopic microscope used in a processing application, such as in giving medical treatment, and especially to one used for working on an observed object while observing through the microscope. The present invention provides a photographic apparatus suitable for attachment to a stereoscopic microscope that yields excellent images without hindering the performance of working on an object while simultaneously observing the object through the stereoscopic microscope. Also the present invention relates to the combination of a stereoscopic microscope and a photographic apparatus.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
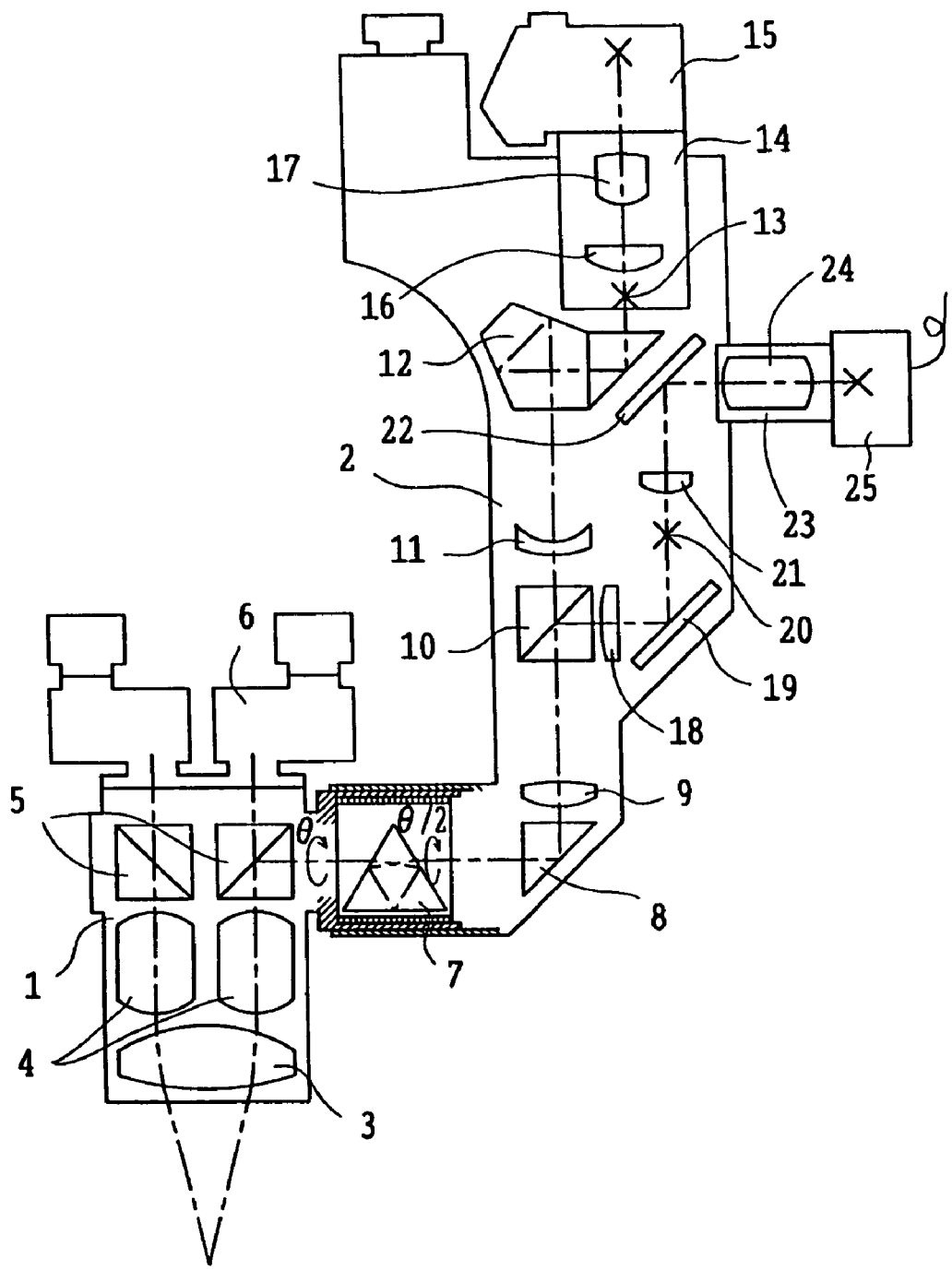
FIG. 1 is a front view of the entire optical system of a stereoscopic microscope according to Embodiment 1 of the present invention.
Figure 2:
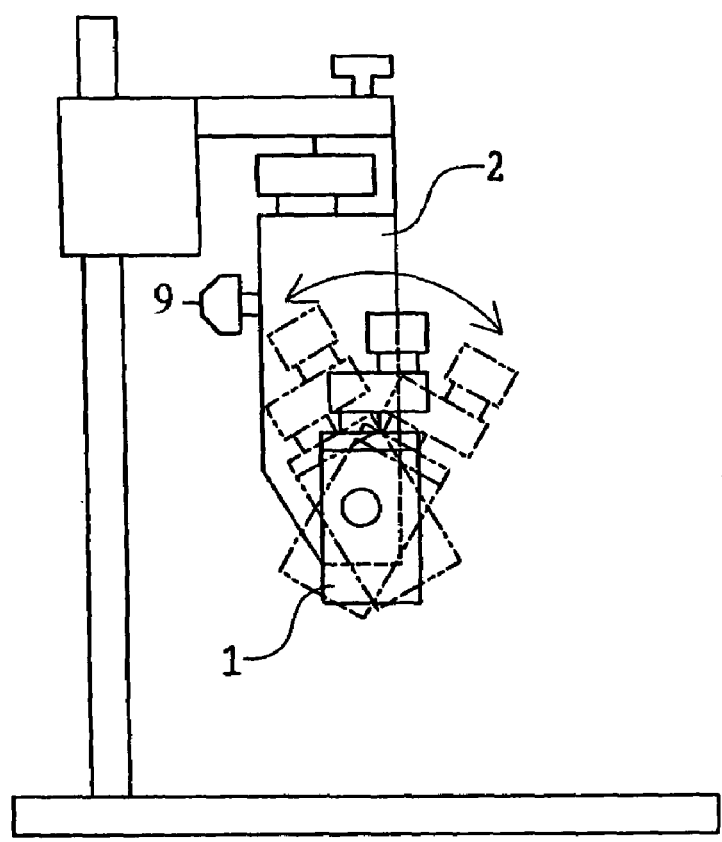
FIG. 2 is a side view of the stereoscopic microscope shown in FIG. 1.
Figure 3:
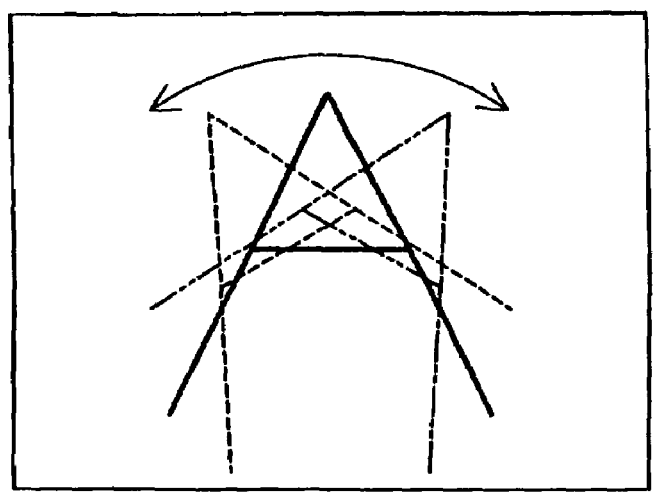
FIG. 3 is for explaining the photographic image achieved in Embodiment 1.

The present invention relates to a photographic apparatus for use with a stereoscopic microscope, and to the combination of a stereoscopic microscope and a photographic apparatus, which enables two types of photographic detectors, such as one that takes still pictures with high resolution and one that takes moving pictures with lesser resolution, to be simultaneously attached to a stereoscopic microscope. The stereoscopic microscope forms images to be recorded by guiding a light flux, which is split off from one of two observation optical paths viewed by a first observer, to the photographic apparatus. The photographic apparatus then divides this light flux using optical path splitter means. An intermediate image plane is formed in each divided optical path, and an optical system is provided which relays the intermediate images to a receiving surface of a respective photographic detector.

In the optical system of a conventional photographic apparatus used for a stereoscopic microscope, the intermediate image is common for the two different image detecting devices. Therefore, in order to prolong the distance from the intermediate image position to the image detecting surface of the image detecting device without causing much of a change in the imaging magnification on the detecting surface, the diameters of the lenses and/or other optical components arranged in the optical path from the intermediate image to the image detecting surface tends to become large in order to prevent the light flux from being eclipsed. On the other hand, in the present invention, the intermediate image is formed in each of the divided optical paths directed to the two image detecting devices, respectively. Therefore, the size of one intermediate image is able to be determined independently from the other. This enables one to change the position of each of the intermediate images without causing much of a change in the distance from the intermediate images to the image detecting devices. Also, the diameters of the optical components which follow the intermediate images can be made somewhat small because the imaging magnification of the intermediate images in the divided light paths can be set so as to prevent eclipsing even when the optical components used in the optical paths from the intermediate images to the image detecting devices are small. Further, the positions of the image detecting surfaces and/or the orientation of an image can be easily adjusted by increasing the distance from the beam splitting members to the intermediate image formation planes and by inserting a reflection member in each optical path.

A beam spitting prism composed of two joined prisms, a smaller mirror, and a quick return mirror are examples of beam splitters that may be used in the present invention. The variety of image detecting devices has increased in recent years and includes 35 mm film, APS film, a large CCD for use with a digital camera, and a smaller CCD for use with a television camera. In addition, upon comparison of the sizes of these image detecting devices, one finds that the largest type is greater than 9 times the size of the smallest type. When attempting to make an optical system compatible with such a large size range by adjusting the focal length of an optical system following the intermediate images, the number of lenses in one of the two optical systems arranged in the divided optical paths becomes much different from that in the other of the two optical systems. This results in an increase in manufacturing costs. In order to avoid this problem, it is preferable that the size of the intermediate image is changed appropriately and the number of lens elements in each optical path is made about the same. In order to accomplish this, it is preferable that the following Condition (1) is satisfied in each optical path:

$$-0.45 \geq \beta \geq -4 \qquad \text{Condition (1)}$$

where

β is the magnification when the intermediate image is formed on the image receiving surface of the image detecting device.

When the adapter image formation magnification β exceeds the upper limit, the number of lens elements increases in order to maintain high picture quality of the optical system which forms images onto the detector having a smaller size, and when it falls below the lower limit, the number of lens elements increases in order to maintain high picture quality of the optical system which forms images onto the detector having a larger size.

Generally, because image detectors that are used for still picture photography have a larger surface area than image detectors used for moving picture photography, Condition (1) is easily satisfied by using separate optical systems for each type of detector. When a relay optical system is used having more than a single intermediate image, it is preferred that the following Condition (2) is also satisfied so as to prevent deterioration of image quality:

$$-0.55 \geq \beta \geq -3 \qquad \text{Condition (2)}$$

where β is as defined above.

When the upper limit of Condition (2) is not satisfied, high picture quality of the optical system which forms images onto the detector having a smaller size becomes difficult, and when the lower limit of Condition (2) is not satisfied, high picture quality of the optical system which forms images onto the detector having a larger size becomes difficult. Satisfying Condition (2) is especially effective for decreasing the deterioration of image quality by canceling the aberrations of the relay optical systems by the optical system arranged between the intermediate image and the image receiving surface, and for reducing the number of lens elements required in order to simplify the relay optical system.

In addition, when using a TV camera having an optical system that uses a color separation prism such as a triple plate optical system (a 3CCD etc.) as the image detecting device, a telecentric optical system (wherein the exit pupil is substantially distant) is commonly used in order to prevent the effect of angular dependency of color from being generated by the image detection device. Generally this angular dependency results in the color being changed dependent on the angle of the light ray incident on the image receiving surface. In such a case, the exit pupil of the image formation lens may be adjusted to lie at infinity by providing the pupil relay lens group and the image formation lens group between the intermediate image and the detecting surface of the image detecting device. Moreover, if a Gaussian-type lens system (one having two lenses of relatively strong concave curvature that face each other) is used as the image formation lens group, the astigmatism and spherical aberration are easily corrected. Further, because the secondary spectrum for chromatic aberrations increases and becomes prominent due to the presence of the relay optical system, the secondary spectrum is easily corrected when using anomalous dispersion glass for the convex lenses that are adjacent to, or combined with, the negative lenses having strong concave surfaces. The term "adjacent to" as used herein means at a small air spacing.

It is often desirable to be able to easily change the position and/or orientation of the stereoscopic microscope in order to change the observation position when viewing an observed object. However, if the entire stereoscopic microscope and photographic apparatus were to be moved or reoriented, this would be difficult due to the added weight of the photographic apparatus. For this reason, only the stereoscopic microscope is made to be moved or reoriented so as to lighten the weight of the moving parts. However, such an arrangement generates a problem in that the image will often become rotated out of proper viewing orientation due to the movement of the stereoscopic microscope body relative to the photographic apparatus.

In order to resolve this problem, an image rotator may be provided. When the light flux exiting the stereoscopic microscope and entering the photographic apparatus is substantially collimated, it is especially convenient to position the image rotator in the substantially collimated light flux, and to provide a mechanism to rotate the image rotator at one-half the rate and in the same direction as the rotation direction of the stereoscopic microscope. As is well known in the art, such an arrangement causes the image to maintain a proper orientation despite any rotation of the stereoscopic microscope. By making the light flux at the image rotator collimated, a refraction-type image rotator can be used. Also, the image rotation can be implemented and adjustments are simplified, since the image center will not change even if the image rotator is moved in the direction of the optical axis. In addition, the amount of rotational enertia around the rotation axis of the stereoscopic microscope should be minimized in order to ease the tilt operation of the stereoscopic microscope, and the center of gravity of the stereoscopic microscope should be on an extended line of the rotation axis of the image rotator.

It is preferred that the image rotator be as small as possible. Accordingly, a conjugate position of the stereoscopic microscope's exit pupil should be arranged within the image rotator. To accomplish this, a one-time image formation relay optical system should be arranged at the object side of the image rotator for relaying the exit pupil of the stereoscopic microscope to the vicinity of the image rotator. Especially when an afocal zooming system of a stereoscopic microscope is composed of a zoom lens part and a one-time intermediate image relay part, the one-time intermediate image relay part can share one or more components with an image formation part that relays an exit pupil of the stereoscopic microscope to the vicinity of the image rotator. By this, miniaturization can be realized and the number of lens elements and prisms needed can be reduced.

Several embodiments of the present invention will now be described with reference to the drawings. Where an item is obscured by reason of being behind an illustrated item, the label number for that item will be listed in parenthesis.

Embodiment 1

FIGS. 1 through 11 relate to Embodiment 1. The entire structure of Embodiment 1 will be described with reference to FIG. 1. The present embodiment is a stereoscopic microscope device that includes a photographic apparatus. The stereoscopic microscope may be either an industrial microscope for processing an observed object while observing magnified stereoscopic images, or it may be a surgical microscope for use by a surgeon in providing magnified stereoscopic images of an affected part within a surgical area. A microscope body 1 is attached to an arm 2, and the arm 2 is attached to a platform (not shown). The microscope body 1 is able to rotate relative to the arm 2, and thus the direction of observation is changeable.

An objective lens 3, afocal zooming optical systems 4, 4, beam splitters 5, 5 and a binocular tube optical system 6 are housed in the microscope body 1. The objective lens 3 substantially collimates the light flux from an observed object. The afocal zooming optical systems 4, 4 provide a zoom function to the substantially collimated light fluxes received from the objective lens 3 and the light that exits these systems is also substantially collimated. However, the afocal zooming optical systems can be omitted when a zooming function is not needed, such as in a fixed focal length system having a proper magnification. An interchangeable lens system can be used for changing magnification instead of using a zooming system.

Beam splitters 5, 5 can be installed when a portion of the light flux for observation is to be split off for use by a photographic apparatus or a measurement device. In the present embodiment light fluxes are split off and guided into two image detecting devices via an image rotator that is arranged at a connecting part between the microscope body 1 and the arm 2, as will be described in further detail later. Further, a binocular tube 6 houses image formation lenses for forming left and right images using the substantially collimated light fluxes, erecting optical systems for erecting the images, and eyepiece lenses. Since these components are well known and widely used, they have been omitted from FIG. 1. Recently, instead of the viewer viewing through eyepiece lenses, it has also been possible to observe using image display elements within the binocular tube 6, or observations of a low illuminance object can be achieved by using image intensifiers, such as photo multipliers within the binocular tube 6. The present invention does not interfere with such constructions.

As described above, there is a great demand to be able to display a work area while observing the work area in real time using a stereoscopic microscope, the images of which are displayed on one or more monitors so that additional observers can view the work area. Moreover, there is also a need to be able to record high quality still pictures having a higher image quality than is typically used for recording moving images in real time. For this reason, in the present embodiment, the arm 2 (which is supported by a platform) houses the necessary optical systems so as to be able to simultaneously attach a plurality of image detecting devices. Also, an image rotator 7 is arranged within a connecting part that connects the microscope body 1 and the arm 2. As may be seen in FIG. 1, the image rotator is actually a component of the photographic optical systems.

A beam splitter 10 is arranged within the arm 2 in the present embodiment so that moving pictures and/or still pictures can be taken. However, the image surface areas used to record a moving picture versus a still picture are different, so the needed magnification is different depending on which type of recording is to be made. Further, the frame sizes (i.e., aspect ratios) of a high quality television camera such a HDTV (high definition television) camera and a common television camera are different. Likewise, even for recording still pictures, the frame sizes vary among 35 mm film cameras, APS film cameras, and digital cameras.

For this reason, it is preferred to change the magnification for an attached image detecting device (and thereby adjust the magnification for recording either moving pictures or still pictures) by using an adapter lens. Accordingly, the present embodiment forms images using collimated light that is transmitted and reflected by the beam splitter 5 with a proper magnification for each type of recording device being adjusted by using the lens components 9 and 11 for still pictures and by using the lens components 9 and 18 for moving pictures. In this way, a reduction in the overall weight can be achieved because a part near the microscope body 1 can be thin by making the lens component 9 common to both imaging systems. In addition, when there is little or no difference between the magnification of a still picture and a moving picture, one or both of the lens components 11 or 18 may be omitted.

A still picture optical system is arranged at the transmission side of a beam splitter 10 in the present embodiment; however, when such an arrangement on the transmission side becomes inconvenient for working on an observation object, the still picture optical system can be arranged at the reflection side of the beam splitter. A still picture optical system forms a single intermediate image, the axial location of which is intermediate image point 13, using the lens components 9 and 11. An image of this intermediate image is formed on the detecting surface of the still picture image detecting device 15 using the still picture adapter 14. The number of lens elements in the still picture adapter 14 can be reduced if the still picture adapter 14 houses a pupil relay lens 16 that is arranged near the intermediate image point 13 and the image formation optical system 17.

Likewise, a moving picture optical system adjusts the magnification so that an intermediate image is formed at the intermediate image point 20 using the lens component 9 and the lens component 18. A pupil relay lens 21 is arranged near the intermediate image point 20 in order to make it easier to correct aberrations by reducing ray heights of the light flux which forms an image after passing through the moving picture adapter 23. The moving picture adapter 23 houses the image formation lens 24 which forms an image having a designated magnification at the detecting surface of the moving picture image detecting device 25. In a moving picture system, the optical characteristics change according to the incident angle of the light flux and the shading effect tends to occur. Especially in the case of an optical system using one or more color separation prisms (such as a triple plate optical system), a substantially telecentric optical system must be used so that all incident rays are within 2° of the surface normal.

In the present embodiment, although a pupil relay lens is built into the still picture adapter 14, a pupil relay lens is not built into the moving picture adapter 23. Thus, it is built-in when the intermediate image point is positioned near the adapter, and it is not built-in when the intermediate image point is positioned farther from the adapter. However, there may be cases when the opposite is true, depending on the circumstances. Also, when a change in the pupil position is not required, the pupil relay lens may be omitted.

The vertical orientation of an image observed by an observer and the vertical orientation of an image to be photographed should match. This can be accomplished by adjusting the reflection direction of various reflection members because the vertical orientation of an image depends on the orientation of the image rotator 7, the reflection members 8, 12, 19, and 22, and the beam splitters 5 and 10. Because a reflection member is arranged on the image side of the beam splitter 10 in the present embodiment, the orientation of an image can be changed by changing the arrangement of these reflection members according to the arrangement of the image detecting devices 15 and 25. In addition, depending on the arrangement of these reflection members, the miniaturization of the arm 2, as well as a configuration that does not affect the operability of the device, can be made possible.

Generally, because a photographic apparatus that splits the optical path from a microscope body and an optical system of an observation device used for other observers are comparatively large and heavy, when these are attached to a microscope body that is attached to the tip of an arm, the tip part of the arm becomes heavy and its stability is impaired. Accordingly, the weight of the platform needs to be increased in order to achieve greater stability, and there is a problem in that the entire microscope device becomes enlarged. In order to prevent this, there are configurations that place optical systems such as those mentioned above inside the arm. The present embodiment adopts such a construction. In this manner, when an optical system used for the image detecting devices 15 and/or 25 (such as a television camera, a still camera using silver salt film, a digital still camera, and so forth) are built into the arm, the tip part of the arm becomes lighter, and the enlarging of the entire microscope device can be avoided. Such a construction also makes the arm less of a visible obstruction for an observer.

Furthermore, at times when observing using a microscope, an observer may change the observation direction to an observed object. It is especially desirable to be able to rotate the microscope about a horizontal rotation axis, in the directions as shown by the double-headed arrow in FIG. 2. In order to accomplish this, the microscope body 1 should be capable of being rotated about a rotation axis in relation to the arm 2. However, because the image detecting devices 15 and 25 are attached to the arm 2, when the microscope body 1 is rotated, the image orientation also rotates as shown by the double-headed arrow in FIG. 3. Thus, the orientation with respect to vertical of the image (solid line "A") observed by an observer and the orientation with respect to vertical of the photographed image (broken line "A"), do not match. Accordingly, in order to correct the rotation of the image, an image rotator 7 that is rotated one-half the amount of rotation θ of the microscope body 1 relative to the photographic apparatus, and in the same direction, is arranged in the light path of the present embodiment. In this manner, no rotation of the image to be photographed occurs, and the tip part of the arm 2 is made lighter. Further, if the center of gravity of the stereoscopic microscope (the microscope body 1 and the binocular tube 6) is positioned nearly on a line that is an extension of the rotation axis of the image rotator 7, the microscope body 1 can be rotated in relation to the arm 2 with little force.

As background information, the image field observed through an eyepiece lens is usually circular but the image field of the still picture image detecting device or of the moving picture image detecting device is usually rectangular, no matter whether the picture detecting device is film or a CCD. Therefore, the image field does not fully match the shape of the image detecting surface. In one case, the image may be projected onto an image detecting surface so that a diagonal length of the image detecting surface and the diameter of the image field coincide, that is, the circular image circumscribes the rectangular image detecting surface. In another case, the image may be projected onto the image detecting surface so that the circular image is fully included within the image detecting surface (i.e., the circular image is inscribed within the image detecting surface). For most effectively utilizing the image detecting surface, the circular image should be inscribed within the rectangular image detecting surface. However, for other reasons, a smaller image is normally utilized so as to leave some clearance between the circular image field and the periphery of the image detecting surface.

Table 1 below lists the construction data for a still picture optical system according to Embodiment 1. This example can be used for projecting an image observed using an image formation lens having a focal length of 176 mm and an eyepiece having a field number of 17.6 onto an image detecting surface so that the circular image field circumscribes the rectangular image detecting surface. More specifically, the surface number #, in order from the object side, the radius of curvature R of each surface, the on-axis spacing D between surfaces, as well as the index of refraction $N_d$ and the Abbe number $v_d$ (measured relative to the d-line) of each optical element in a still picture optical system (i.e, from the lens component 9 to the reflection member 12) are listed. In Table 1, surfaces #1 through #3 are surfaces of the lens component 9, surfaces #4 and #5 are the planes of the beam splitter 10, surfaces #6 and #7 are surfaces of the lens component 11, and surfaces #8 and #9 are the planes of the reflection member 12. Further, the distance from the surface #9 to the intermediate image point 13 is 11.5 mm.

TABLE 1

(Still Picture Optical System)

| # | R | D | $N_d$ | $v_d$ |
|---|---|---|---|---|
| 1 | 46.563 | 4 | 1.48749 | 70.2 |
| 2 | −52.717 | 2 | 1.57099 | 50.8 |
| 3 | 295.605 | 72.69 | | |
| 4 | ∞ | 18 | 1.51633 | 61.1 |
| 5 | ∞ | 4 | | |
| 6 | −24.903 | 2.6 | 1.6968 | 55.5 |
| 7 | −31.806 | 22 | | |
| 8 | ∞ | 62 | 1.51633 | 61.1 |
| 9 | ∞ | 11.5 | | |
| 10 | intermediate image | | | |

When an interchangeable lens type, 35 mm still camera is attached to the above still picture optical system, the intermediate image must be enlarged 2.41 times using an adaptor lens.

Table 2 below lists the construction data for such an adaptor lens. More specifically, the surface number #, in order from the object side, the radius of curvature R of each surface, the on-axis spacing D between surfaces, as well as the index of refraction $N_d$ and the Abbe number $v_d$ (measured relative to the d-line) of each optical element within the still picture adaptor 14 shown in FIG. 1 are listed. Surfaces #2 and #3 are the pupil relay lens 16 and surfaces #4 through #10 are the surfaces of the image forming optical system 17. In the bottom portion of the table is listed the magnification of the still picture adaptor lens.

TABLE 2

(Still Picture Adaptor Lens for 35 mm Still Camera Attached to the Still Picture Optical System of Table 1)

| # | R | D | $N_d$ | $v_d$ |
|---|---|---|---|---|
| 1 | intermediate image | 15 | | |
| 2 | −85.872 | 4.7 | 1.58913 | 61.1 |
| 3 | −21.592 | 23.2 | | |
| 4 | 8.883 | 4.8 | 1.72916 | 54.6 |
| 5 | −14.804 | 1.5 | 1.7847 | 26.2 |
| 6 | 28.308 | 3.4 | | |
| 7 | −14.665 | 1.3 | 1.7847 | 26.2 |
| 8 | 8.294 | 2.5 | | |

TABLE 2-continued (Still Picture Adaptor Lens for 35 mm Still Camera Attached to the Still Picture Optical System of Table 1)

| # | R | D | $N_d$ | $v_d$ |
|---|---|---|---|---|
| 9 | 22.349 | 2.6 | 1.80518 | 25.4 |
| 10 | −16.254 | 60 | | |
| 11 | final image (film surface) | | | |

β = −2.41

Figure 4:
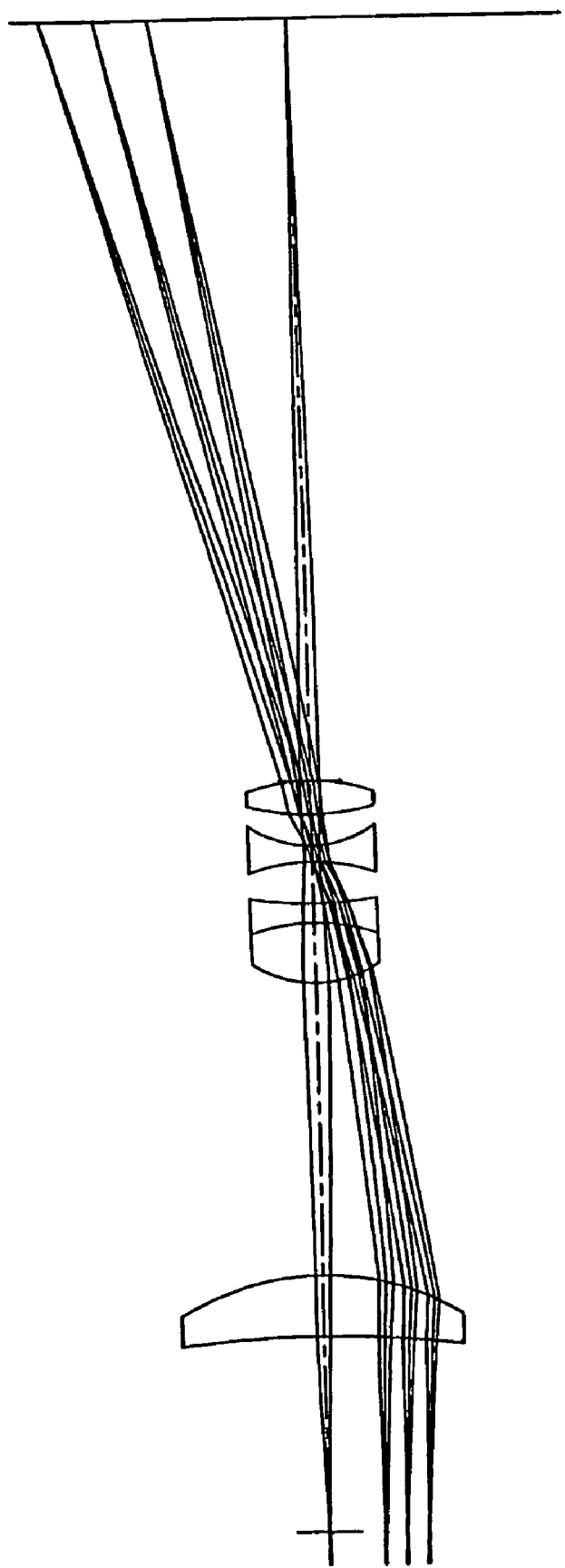
FIG. 4 is a cross-sectional view showing one example of lens construction, housed within the still picture adaptor 14 of FIG. 1, that includes an image formation lens and a pupil relay lens that are for use when a 35 mm film camera is used as the still picture image detecting device 15 of FIG. 1.
Figure 5:
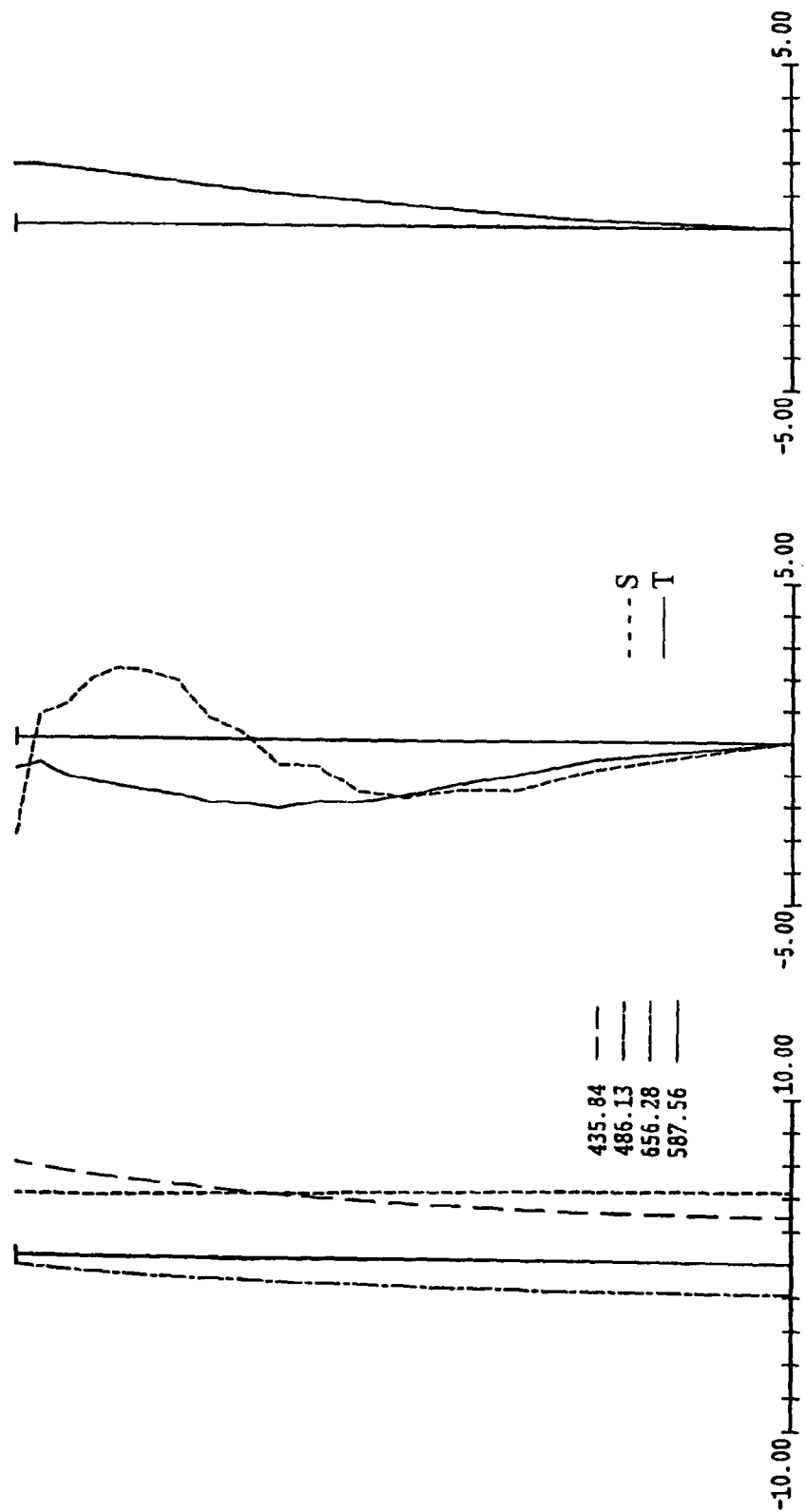
FIGS. 5(a)–5(c) show various aberrations that occur in the light flux subsequent to the lens component 9 (shown in FIG. 1) when using the lens construction shown in FIG. 4.

FIG. 4 illustrates a cross-sectional view of the above still picture adaptor lens, and FIGS. 5(a)–5(c) show the spherical aberration (in mm) at various wavelengths (in nm), the astigmatism (in mm) in the sagittal S and tangential T image planes, and the distortion (in %), respectively, generated by the optical system of the lens component 9 through the above still picture adaptor lens.

A digital still camera has been used as the still picture image detecting device 15. Where the digital still camera is of the interchangeable lens type, the above still picture adaptor lens can still be used because only the photographic area is different. However, there are also some occasions when one may want to use a digital still camera that is not of the interchangeable lens type. If the digital still camera is a type where the proper magnification can be obtained by photographing an intermediate image formation plane directly by using a macro function, the macro function can be used to obtain a proper magnification. In this situation, circumstances may arise where both a pupil relay lens 16 and an image formation optical system 17 are unnecessary. Also, occasions may arise when only the image formation optical system 17 is unnecessary. Where a still picture image formation optical system is unnecessary, however, it should be noted that the lens of the digital still camera actually performs the role of the image formation optical system 17.

When eclipsing of the light flux occurs because either the enlargement by using a macro function as discussed above is not sufficient, or the pupil position is not appropriate for using only the lens of a digital still camera, then the digital still camera must be attached to a still picture adapter 14 that houses only a pupil relay lens 16. In this case, the focus position of the digital still camera lens is set to infinity and the pupil relay lens 16 creates a substantially collimated light flux.

Table 3 below list the construction data for a pupil relay lens for digital still cameras. More specifically, the surface number #, in order from the object side, the radius of curvature R of each surface, the on-axis spacing D between surfaces, as well as the index of refraction $N_d$ and the Abbe number $v_d$ (measured relative to the d-line) of each optical element are listed.

TABLE 3

(Pupil Relay Lens for Digital Still Cameras)

| # | R | D | $N_d$ | $v_d$ |
|---|---|---|---|---|
| 1 | intermediate image | 14.2 | | |
| 2 | −38.842 | 5.37 | 1.84666 | 23.8 |
| 3 | 38.842 | 13.93 | 1.58913 | 61.1 |
| 4 | −38.842 | 1.28 | | |
| 5 | 185.567 | 7.8 | 1.48749 | 70.2 |
| 6 | −57.837 | 1.28 | | |

TABLE 3-continued (Pupil Relay Lens for Digital Still Cameras)

| # | R | D | $N_d$ | $v_d$ |
|---|---|---|---|---|
| 7 | 44.344 | 10.74 | 1.48749 | 70.2 |
| 8 | 111.64 | | | |

Figure 6:
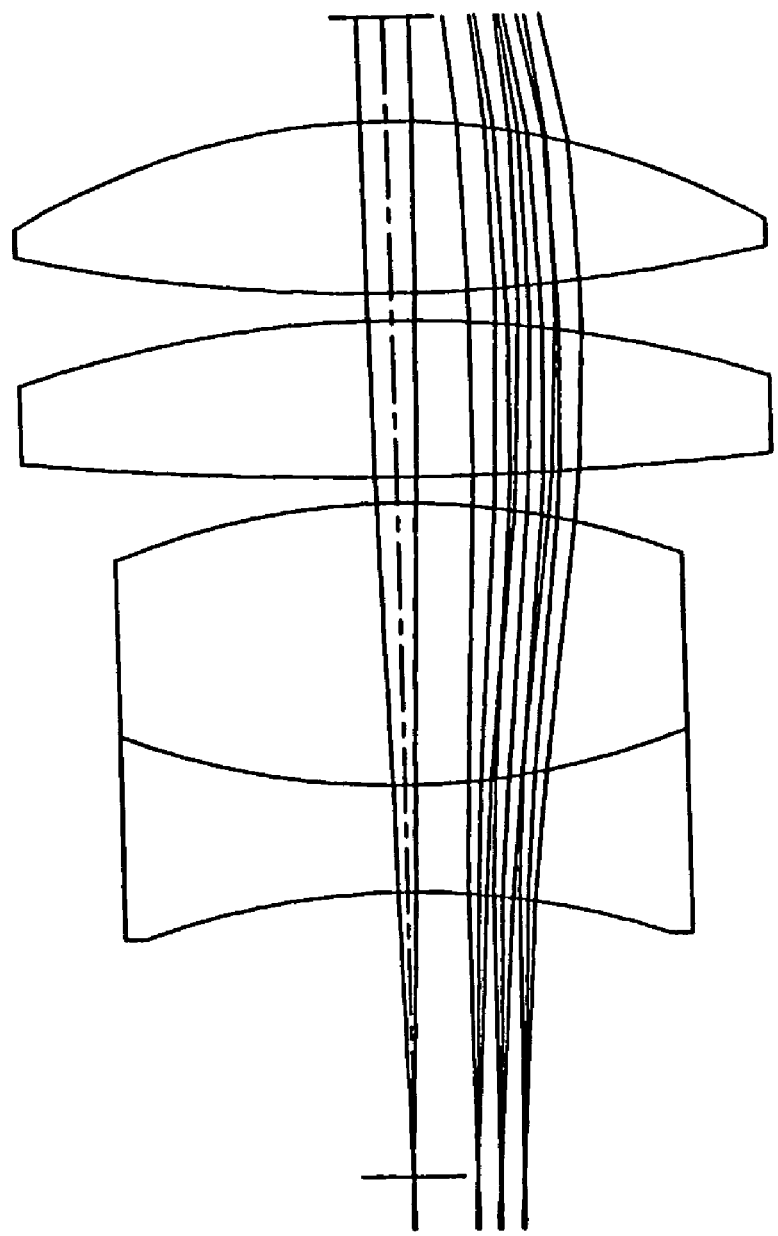
FIG. 6 is a cross-sectional view showing one example of lens construction within the still picture adaptor 14 that includes only a pupil adaptor lens for use when a digital still camera is used for the still picture image detecting device 15.
Figure 7:
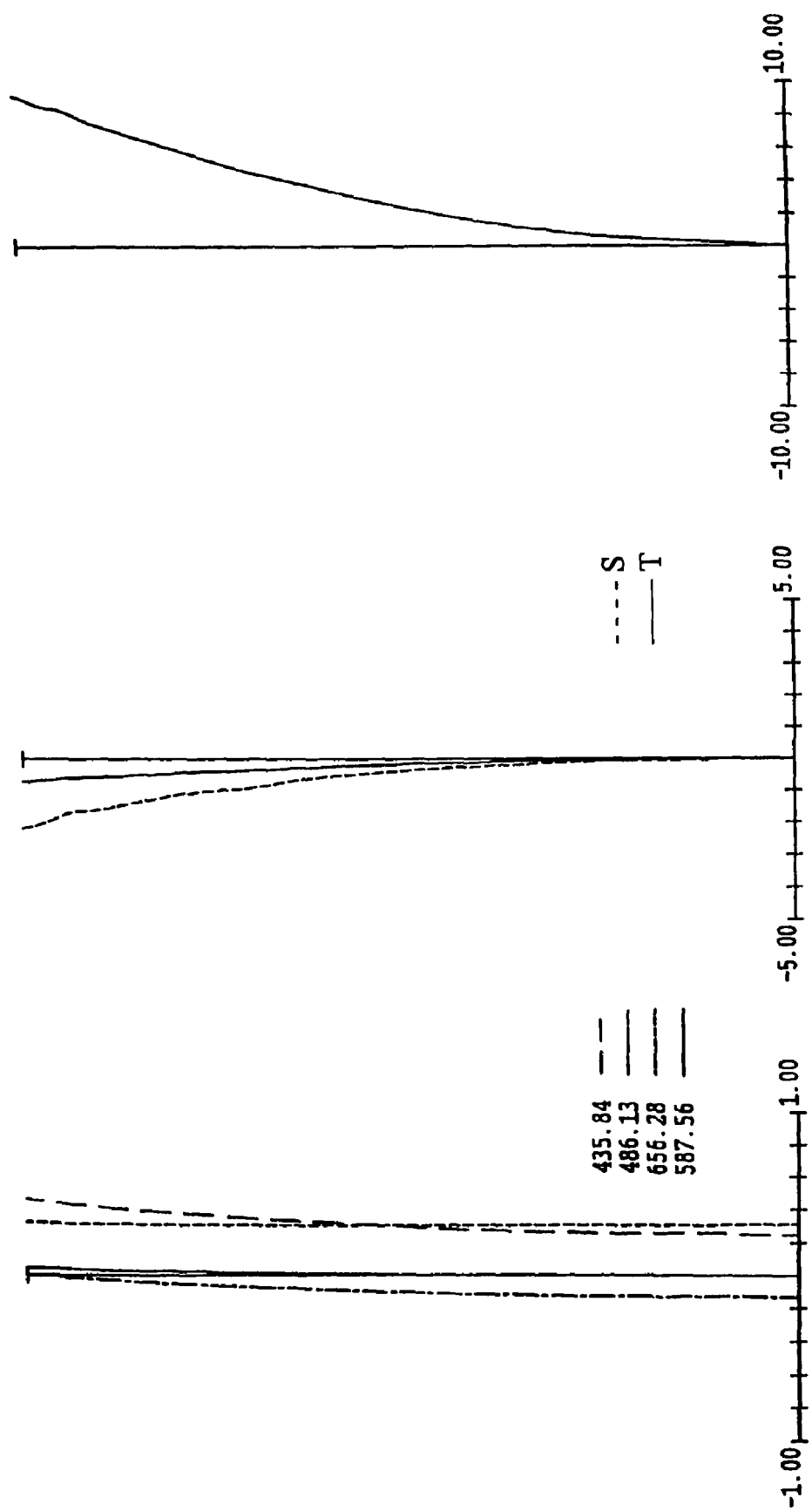
FIGS. 7(a)–7(c) show various aberrations that occur in the light flux subsequent to the lens component 9 (shown in FIG. 1) when using the lens construction shown in FIG. 6.

FIG. 6 is a cross-sectional view of a pupil relay lens for digital still cameras (which corresponds to item 16 in FIG. 1) constructed according to Table 3, and FIGS. 7(a)–7(c) show the spherical aberration (in mm) at various wavelengths (in nm), the astigmatism (in mm) in the sagittal S and tangential T image planes, and the distortion (in %), respectively, generated by the optical system of the lens component 9 (FIG. 1) through the pupil relay lens 16 (FIG. 1). As is apparent from FIG. 7(c), the distortion at maximum image height increases to about 10%; however, correction for distortion can be easily performed using picture processing techniques since the images are in digital form. This serves to reduce the number of lens elements of the still picture relay lens and, even if images at the periphery have an insufficient brightness, the brightness at the periphery of the image field can be easily corrected through digital picture processing. This example can be used with a digital camera whose taking lens has a focal length of 100 mm in terms of 35 mm still camera conversion so that the circular image field matches a diagonal of the rectangular image detecting surface.

When the taking lens of the digital camera has a focal length of this amount, the lens diameters can be made smaller and the number of lens elements can be reduced. The image magnification of a taking lens of the digital still camera whose focal length is 100 mm in terms of a 35 mm camera conversion is about 0.56 when the image detecting device of the digital still camera is a ½ inch CCD. Accordingly, in order to obtain high quality pictures, many lens elements are needed in the adaptor lens.

Referring again to FIG. 1, for a photographic system for moving pictures, there is the lens component 18 for forming an image at a moving picture intermediate image surface that intersects the optical axis at position 20 in the optical path that is reflected from the beam splitter 10, and there is the pupil relay lens 21 for reducing the diameter of the light flux incident onto an image formation lens 24. In addition, reflection members 19 and 22 are provide in the light path so as to enable attachment of a moving picture image detecting device 25 at a suitable position.

Table 4 below lists an example of the lens construction data of this moving picture optical system (from the light incident side of beam splitter 10 to the reflection member 22). More specifically, Table 4 lists the surface number #, in order from the object side, the radius of curvature R of each surface, the on-axis spacing D between surfaces, as well as the index of refraction $N_d$ and the Abbe number $v_d$ (both measured relative to the d-line) of each optical element of the moving picture optical system from the light incident surface of the beam splitter 10 through the reflection member 22. Moreover, in Table 4, surfaces #1 and #2 are surfaces of the beam splitter 10, surfaces #3 and #4 are surfaces of the lens component 18, surface #5 is the reflection member 19, surface #6 is an intermediate image surface, surfaces #7 and #8 are surfaces of the pupil relay lens 21 and surface #9 is the reflection member 22. The degradation of the optical performance of the optical system between the intermediate image and the final image is reduced by making the still picture intermediate image formation magnification different from the moving picture intermediate image formation magnification.

TABLE 4

(Moving Picture Optical System)

| # | R | D | $N_d$ | $v_d$ |
|---|---|---|---|---|
| 1 | ∞ (beam splitter) | 18 | 1.51633 | 61.1 |
| 2 | ∞ (beam splitter) | 1 | | |
| 3 | 29.582 | 2.5 | 1.51633 | 61.1 |
| 4 | ∞ | 8.5 | | |
| 5 | ∞ (reflector) | 16.62 | | |
| 6 | Intermediate image | 5 | | |
| 7 | 49.991 | 3 | 1.51633 | 61.1 |
| 8 | ∞ | 30.32 | | |
| 9 | ∞ (reflector) | | | |

The ratio of the still picture intermediate image height divided by the moving picture intermediate image height is 2.46.

As shown in FIG. 1, an image formation lens 24 is arranged within the moving picture adapter 23 and is made to correspond to a plurality of moving picture image detecting devices 25 which have different image sizes by exchanging the moving picture adapter.

Table 5 below lists the construction data for an image formation lens when using a ¼ inch CCD. More specifically, Table 5 lists the surface number #, in order from the object side, the radius of curvature R of each surface, the on-axis spacing D between surfaces, as well as the index of refraction $N_d$ and the Abbe number $v_d$ (both measured relative to the d-line) of each optical element. In the bottom portion of the table is listed the magnification β of the image formation lens.

TABLE 5

(Image Formation Lens for 1/4 inch CCD)

| # | R | D | $N_d$ | $v_d$ |
|---|---|---|---|---|
| 1 | ∞ (reflector) | 17 | | |
| 2 | 28.707 | 3.2 | 1.7859 | 44.2 |
| 3 | -39.982 | 0.25 | | |
| 4 | 9.44 | 5.8 | 1.788 | 47.4 |
| 5 | -10.5 | 1.2 | 1.7847 | 26.3 |
| 6 | 4.703 | 3.1 | | |
| 7 | -4.951 | 1.2 | 1.6177 | 49.8 |
| 8 | 21.353 | 5.8 | 1.51633 | 64.1 |
| 9 | -7.644 | 0.2 | | |
| 10 | 24.76 | 2.34 | 1.6968 | 55.5 |
| 11 | -58.474 | 22.39 | | |
| 12 | final image surface | | | |

β = −0.624

Figure 8:
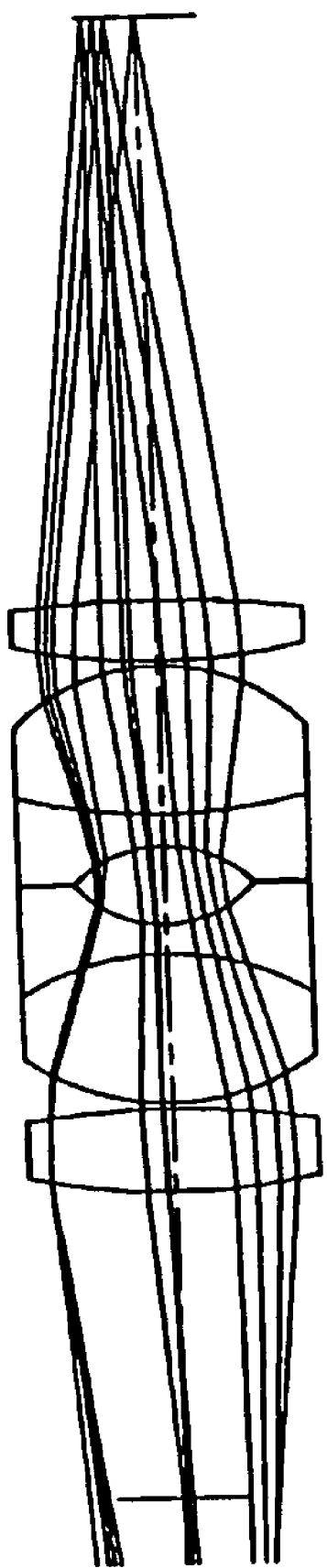
FIG. 8 is a cross-sectional view of one example of lens construction for the image formation lens 24 (shown in FIG. 1), which is for use with the moving picture image detecting device 25 of FIG. 1 having a ¼ inch CCD (as measured diagonally)
Figure 9:
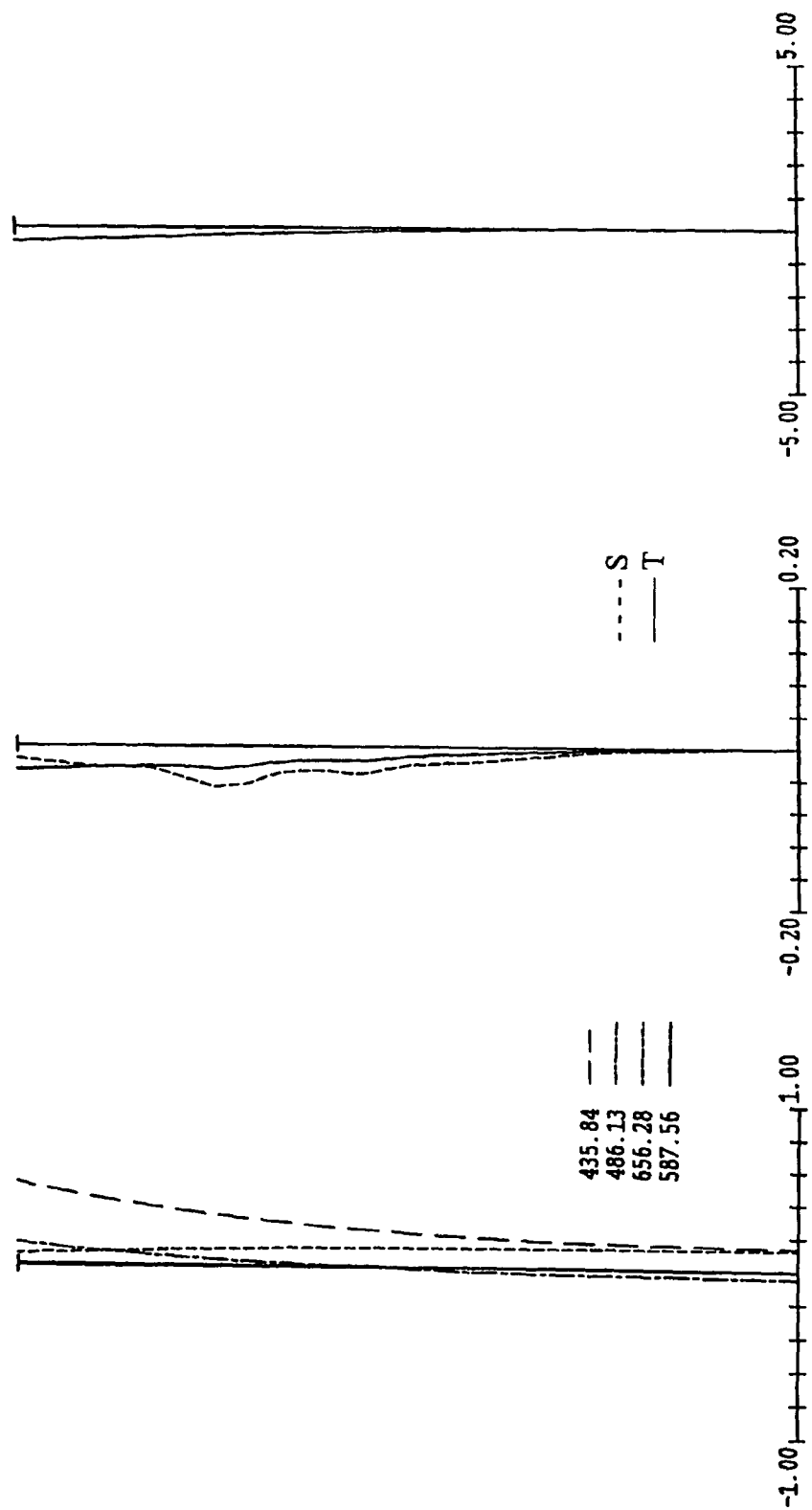
FIGS. 9(a)–9(c) show various aberrations that occur in the light flux subsequent to the lens component 9 (FIG. 1) when using the lens construction shown in FIG. 8.

FIG. 8 is a cross-sectional view of an image formation lens according to the above construction, and FIGS. 9(a)–9(c) show the spherical aberration (in mm) at various wavelengths (in nm), the astigmatism (in mm) in the sagittal S and tangential T image planes, and the distortion (in %), respectively, generated by the optical system of the lens component 9 through the image formation lens shown in FIG. 8.

Table 6 below lists the construction data for a image formation lens 24 when using a ⅓ inch CCD. More specifically, Table 6 lists the surface number #, in order from the object side, the radius of curvature R of each surface, the on-axis spacing D between surfaces, as well as the index of refraction $N_d$ and the Abbe number $v_d$ (both measured relative to the d-line) of each optical element. In the bottom portion of the table is listed the magnification β of the image formation lens.

TABLE 6

(Image Formation Lens for 1/3 inch CCD)

| # | R | D | $N_d$ | $v_d$ |
|---|---|---|---|---|
| 1 | ∞ (reflector) | 17 | | |
| 2 | 26.85 | 3.4 | 1.788 | 47.4 |
| 3 | -50.682 | 0.3 | | |
| 4 | 10.612 | 6.2 | 1.79952 | 42.2 |
| 5 | -8.394 | 1.3 | 1.7847 | 26.3 |
| 6 | 5.353 | 3.2 | | |
| 7 | -5.385 | 1.2 | 1.6223 | 53.2 |
| 8 | 12 | 6.4 | 1.51633 | 64.1 |
| 9 | -8.317 | 0.2 | | |
| 10 | 23.287 | 2.8 | 1.6968 | 55.5 |
| 11 | ∞ | 30.29 | | |
| 12 | final image surface | | | |

β = −0.834

Figure 10:
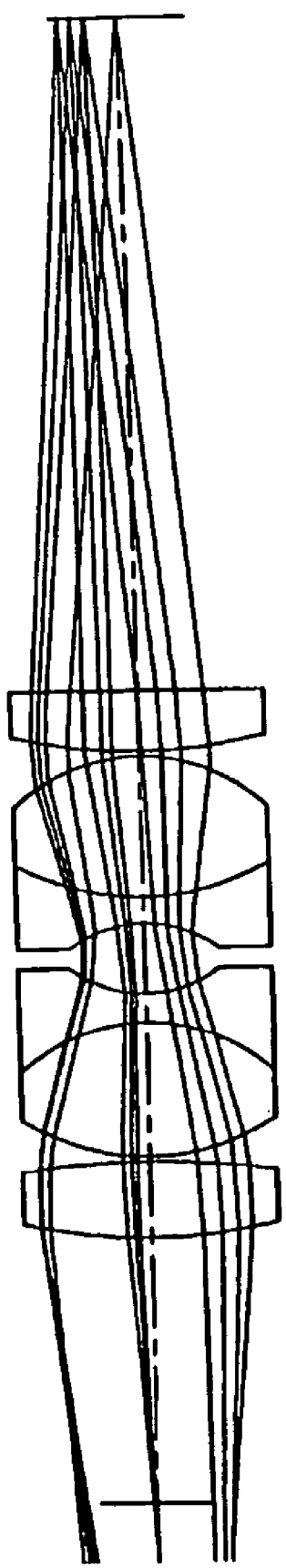
FIG. 10 is a cross-sectional view showing one example of lens construction of the image formation lens 24 (shown in FIG. 1), which is for use with the moving picture adapter image detecting device 25 (shown in FIG. 1) when using a ⅓ inch CCD as the moving picture image detecting device 25.
Figure 11:
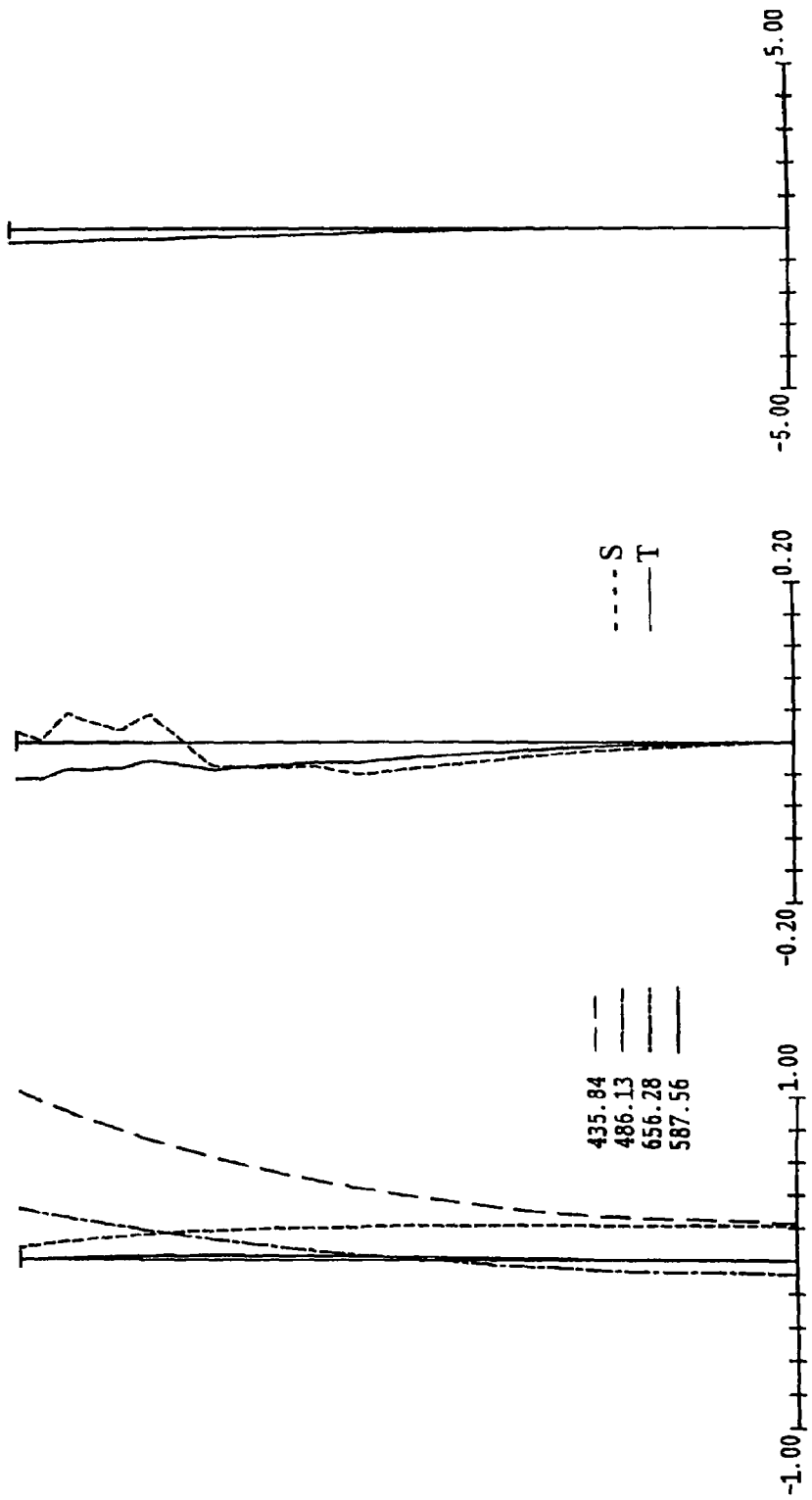
FIGS. 11(a)–11(c) show various aberrations that occur in the light flux subsequent to the lens component 9 (FIG. 1) when using the lens construction shown in FIG. 10.

FIG. 10 is a cross-sectional view of the image formation lens constructed according to Table 6. FIGS. 11(a)–11(c) show the spherical aberration (in mm) at various wavelengths (in nm), the astigmatism (in mm) in the sagittal S and tangential T image planes, and the distortion (in %), respectively, generated by the optical system of the lens component 9 through the image formation lens shown in FIG. 10.

As is apparent from FIGS. 8 and 10, a Gaussian-type lens system is adopted for each of these two image formation lenses. The correction of astigmatism and making the light substantially telecentric becomes easier using a Gaussian-type lens system. Also, because the lens system is substantially telecentric, a moving picture image detecting device of the triple plate type may be used. A Gaussian-type lens system can be used effectively when the following Condition (3) is satisfied:

$$-0.55 \geq \beta \geq -1.3 \qquad \text{Condition (3)}$$

where
β is as defined above.

If the upper limit of Condition (3) is not satisfied, astigmatism becomes excessive and the peripheral image becomes degraded. If the lower limit of Condition (3) is not satisfied, the protrusion amount of the arm 2 becomes larger, and the balance becomes unfavorable because the back focus distance increases and results in the need to place the moving picture image detecting devices 25 considerably farther from the moving picture adapter image formation lens 24.

Embodiment 2

FIGS. 12 through 23(c) relate to Embodiment 2. Because the pupil of a stereoscopic microscope and the image rotator are separated in Embodiment 1, the image rotator becomes relatively large. Because the image rotator is arranged within the rotation mechanism provided at the connecting part of the microscope body and the arm, when the image rotator becomes larger, the rotation mechanism becomes larger, and this leads to the enlargement of the device itself. Accordingly, in Embodiment 2, a pupil relay optical system is made to be arranged at the object side of the image rotator in order to improve this point.

The configuration of the present embodiment will now be described with reference to FIGS. 12 and 13. The stereoscopic microscope according to Embodiment 1 is comprised of the microscope body 1 and the binocular tube 6; however, in the present embodiment it is comprised of a microscope body 26, a beam splitting component 27 and a binocular lens tube 28. Similar to Embodiment 1, the objective lens and the afocal zooming optical system are arranged in the microscope body 26. The image formation lens, the erecting optical system, and eyepiece lenses are arranged in the binocular lens tube 28. The stereoscopic microscope of the present embodiment is connected to an arm 29 via the beam splitting component 27. Further, the microscope body 26 is detachable from the beam splitting component 27 in the present embodiment, and the beam splitting component 27 is detachable from the binocular lens tube 28 in the present embodiment. Thus, it is very convenient from the view point of both manufacturing and maintenance. For instance, the beam splitting component 27 may be easily attached to another microscope body having a different configuration. This is also this case for Embodiment 3.

The image rotator 36 is arranged at the connecting part of the microscope body 26 and the arm 29, and the image rotator 36 is made to rotate at ½ the rotation rate of the microscope body 26 and in the same direction (i.e., the same construction as in Embodiment 1). Further, an optical system that is identical to the optical system housed in the arm 2 of Embodiment 1 is housed in the arm 29. Thus, a separate illustration has been omitted. In addition, two kinds of adapter optical systems (similar to Embodiment 1) are attached to the arm 29. Accordingly, the label numbers used in the following description are identical to those used for the same components of Embodiment 1.

Next, a beam splitting optical system housed in the beam splitting component 27 will be described. A beam splitting element 30, and a beam splitting element 31 (that also serves as a beam synthesizing element) split the light flux from the observed object so that it travels to the left and right. The beam splitting element 30 that is arranged at the left side away from the arm 29 guides the light flux to the arm 29 (FIG. 13). The pupil of a stereoscopic microscope is relayed to the vicinity of the image rotator 36 by the afocal relay system 33 in this left side optical path. Therefore, the afocal relay system 33 forms an internal image. Also, the internal image is formed only once (its axial position is the relay system image formation point 35). The longer the relay distance, the easier it is to improve optical performance. In order to achieve a compact arrangement while having a long relay distance, the light flux is lead around using the reflection members 32 and 34. Examples of the optical systems of the beam splitter 30 through the image detecting devices 15 and 25 will be described later.

Table 7 below lists the construction data of a still picture optical system from the object side of the afocal relay system 33 (i.e., on the object side of the image rotator 36) to the intermediate image point 13 is shown in Table 7. More specifically, Table 7 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element. This example is for photographing an image observed with eyepiece lenses having a field number of 21 and may be used with an image formation lens in the binocular lens tube 28 having a focal length of 210 mm. In this example, the circular image field is fully within the image detecting surface and is inscribed in the image detecting surface. Further, in Table 7, surfaces #1 through #11 are the afocal relay system 33, surfaces #12 and #13 are the image rotator 36, surfaces #14 and #15 are the reflection member surfaces #16 through #18 are the lens component 9, surfaces #19 and #20 are the beam splitter 10, surfaces #21 and #22 are the lens component 11, and surfaces #23 and #24 are the reflection member 12. The entrance pupil of the observation optical system of the stereoscopic microscope is located about 120 mm to the object side from surface #1 . The focal length of the still picture optical system of Table 7 is 164.1 mm.

TABLE 7

(Still Picture Optical System)

| # | R | D | $N_d$ | $\upsilon_d$ |
|---|---|---|---|---|
| 1 | 84.149 | 4 | 1.48749 | 70.2 |
| 2 | −23.09 | 2 | 1.57501 | 41.5 |
| 3 | −55.913 | 50 | | |
| 4 | ∞ | 20 | 1.51633 | 64.1 |
| 5 | ∞ | 17.8 | | |
| 6 | relay system image | 67.3 | | |
| 7 | −30.875 | 2 | 1.741 | 52.6 |
| 8 | 73.091 | 3.5 | 1.48749 | 70.2 |
| 9 | −28.75 | 0.2 | | |
| 10 | 82.152 | 2.8 | 1.48749 | 70.2 |
| 11 | −42.032 | 22. | | |
| 12 | ∞ (image rotator) | 36.9 | 1.7859 | 44.2 |
| 13 | ∞ | 6 | | |
| 14 | ∞ | 18 | 1.51633 | 64.1 |
| 15 | ∞ | 21 | | |
| 16 | 58.474 | 3.7 | 1.48749 | 70.2 |
| 17 | −58.474 | 2.3 | 1.54814 | 45.8 |
| 18 | ∞ | 72.7 | | |
| 19 | ∞ (beam splitter) | 18. | 1.51633 | 64.1 |
| 20 | ∞ | 3.3 | | |
| 21 | −30.575 | 4.1 | 1.72916 | 54.7 |
| 22 | −42.877 | 11.6 | | |
| 23 | ∞ | 60 | 1.51633 | 64.1 |
| 24 | ∞ | 12.6 | | |
| 25 | intermediate image | | | |

Two kinds of optical systems that may be housed in the still picture adapter 14 will now be described. First, Table 8 below lists the construction data of the optical system in the case where the still picture image detecting device 15 is a still camera using 35 mm film. More specifically, Table 8 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element. In Table 8, surfaces #2 and #3 are surfaces of the pupil relay lens 16, and surfaces #4 through #10 are surfaces of the image forming optical system 17. In the bottom portion of the table is listed the magnification β of the optical system of Table 8.

TABLE 8

(Adapter Lens for a Still Camera using 35 mm Film)

| # | R | D | $N_d$ | $\upsilon_d$ |
|---|---|---|---|---|
| 1 | intermediate image | 15 | | |
| 2 | 32.417 | 5 | 1.58913 | 61.1 |
| 3 | −56.778 | 24.1 | | |
| 4 | 8.718 | 7 | 1.58913 | 61.1 |
| 5 | −6.278 | 1.5 | 1.801 | 35. |
| 6 | −17.874 | 3.5 | | |
| 7 | −9.349 | 1.3 | 1.74 | 28.3 |
| 8 | 9.664 | 3.6 | | |
| 9 | 41.353 | 2.8 | 1.80518 | 25.4 |
| 10 | −18.884 | 55.3 | | |
| 11 | final image (film plane) | | | |

β = −2.64

Figure 14:
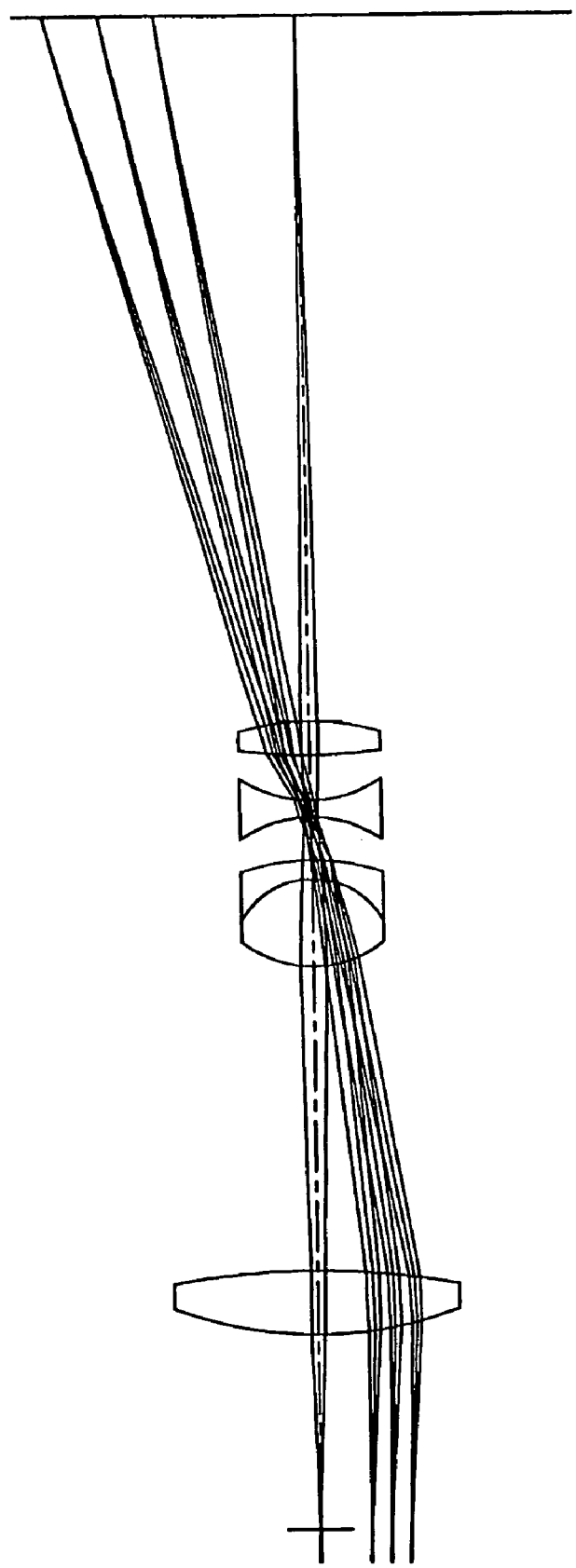
FIG. 14 is a cross-sectional view showing one example of lens construction which may be used in the still picture adapter 14 when a still camera using 35 mm film is the still picture image detecting device 15 of Embodiment 2.
Figure 15:
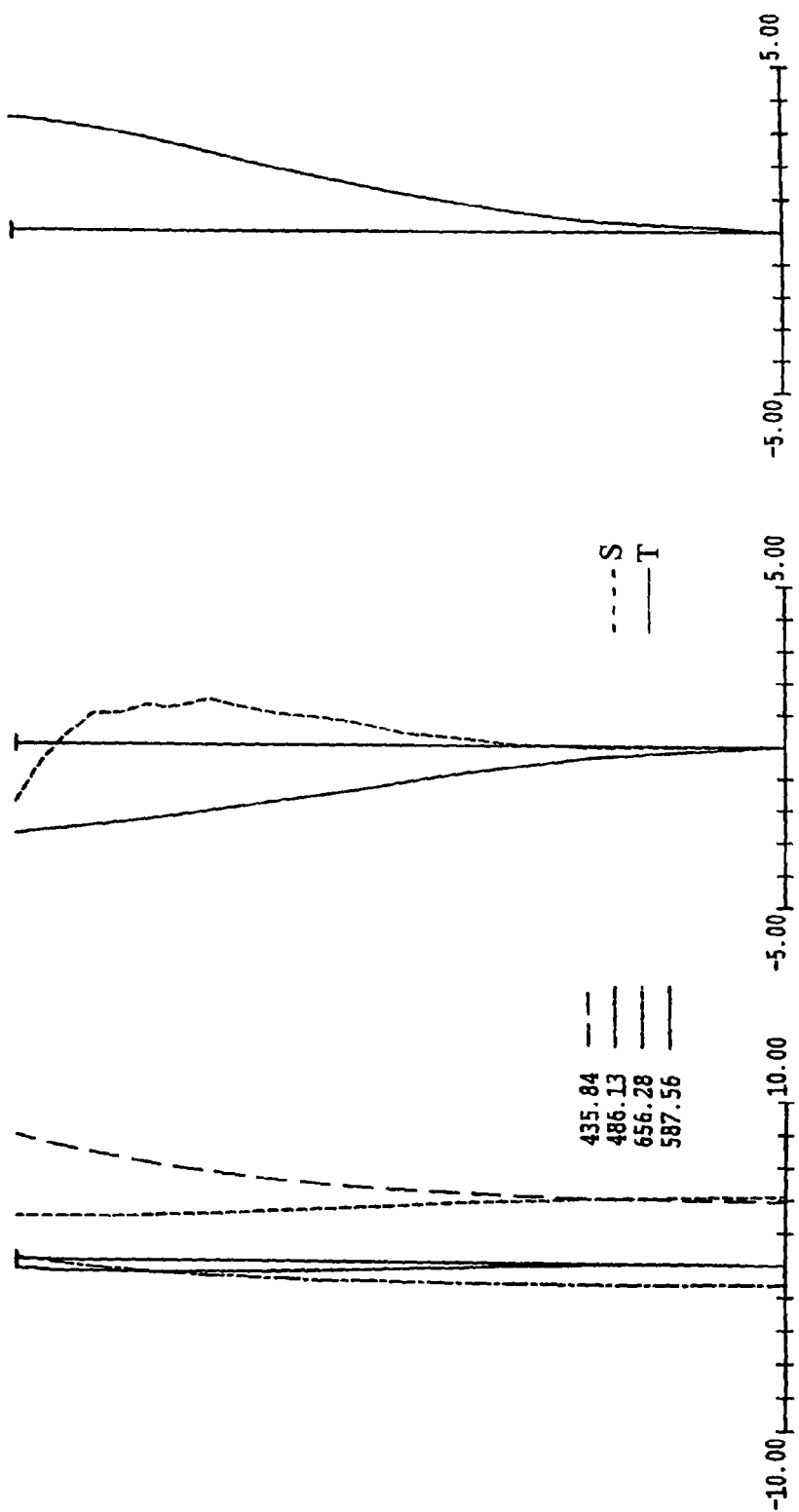
FIGS. 15(a)–15(c) show various aberrations that occur in the light flux subsequent to the afocal relay system 33 (FIG. 13) when adopting the lens construction shown in FIG. 14.

FIG. 14 shows a cross-sectional view of the above-described adaptor lens, and FIGS. 15(a)–15(c) show the spherical aberration (in mm) at various wavelengths (in nm), the astigmatism (in mm) in the sagittal S and tangential T image planes, and the distortion (in %), respectively, generated by the optical system of the afocal relay lens system 33 through the adaptor lens. Generally, when the number of intermediate relayed images increases, the aberrations deteriorate. In Embodiment 2, the optical performance is maintained by using a relay system having a long relay interval, although two intermediate relayed images are formed in Embodiment 2.

Next, the case when the still picture image detecting device 15 is a digital still camera will be described. The still picture adaptor image formation lens in this embodiment is the photographic lens of a digital camera (as was the case in Embodiment 1). The still picture adaptor image formation lens for a 35 mm still camera conversion is made so as to project an image field that matches a diagonal of the rectangular image detecting surface when the lens focal length of the digital still camera is about 100 mm.

Table 9 below lists the construction data for the pupil relay lens 16 for a digital still camera. More specifically, Table 9 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element.

TABLE 9

(Still Picture Pupil Relay Lens for Use with a Digital Still Camera)

| # | R | D | $N_d$ | $\nu_d$ |
|---|---|---|---|---|
| 1 | intermediate image | 14.33 | | |
| 2 | 38.858 | 4.84 | 1.69895 | 30.1 |
| 3 | 24.327 | 3.74 | | |
| 4 | 67.4 | 12.89 | 1.51633 | 64.1 |
| 5 | −20.244 | 4.71 | 1.74077 | 27.8 |
| 6 | −52.489 | 1.21 | | |
| 7 | 66.929 | 10.91 | 1.691 | 54.8 |
| 8 | −48.091 | | | |

Figure 16:
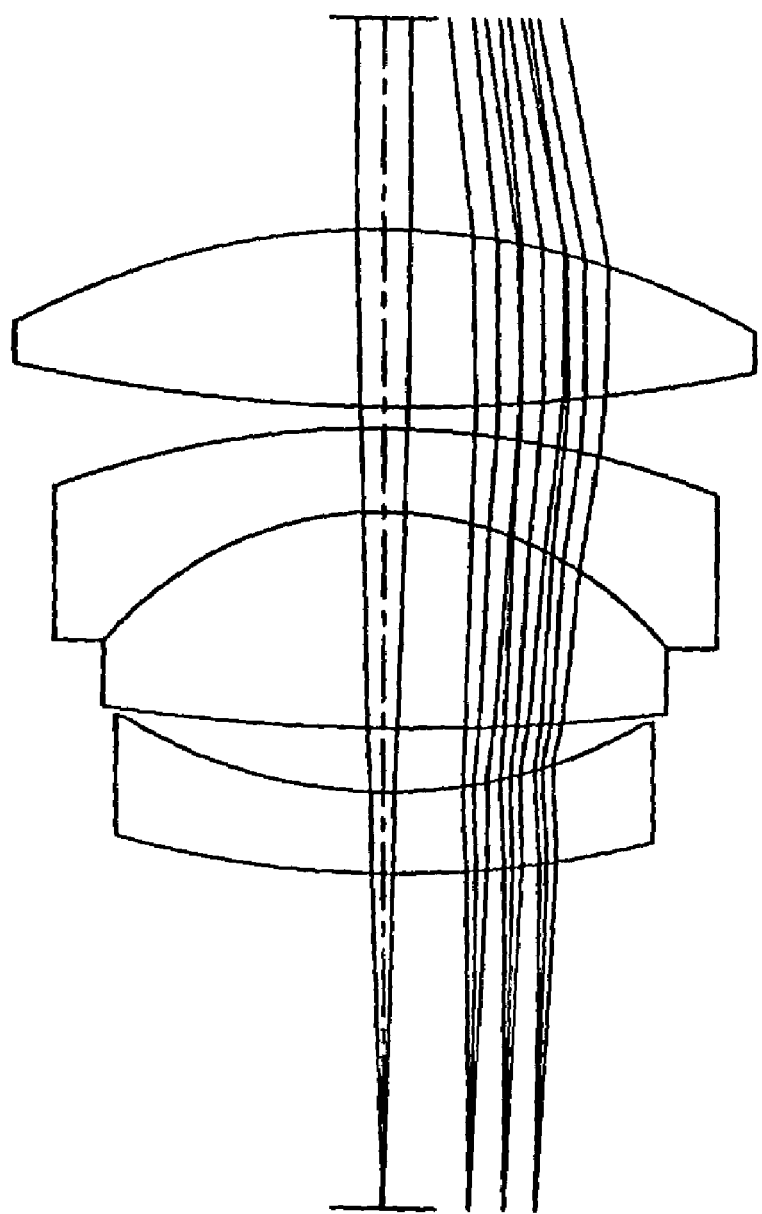
FIG. 16 is a cross-sectional view showing one example of lens construction which may be used in the still picture adapter 14 when a digital still camera is used as the still picture image detecting device 15 of Embodiment 2.
Figure 17:
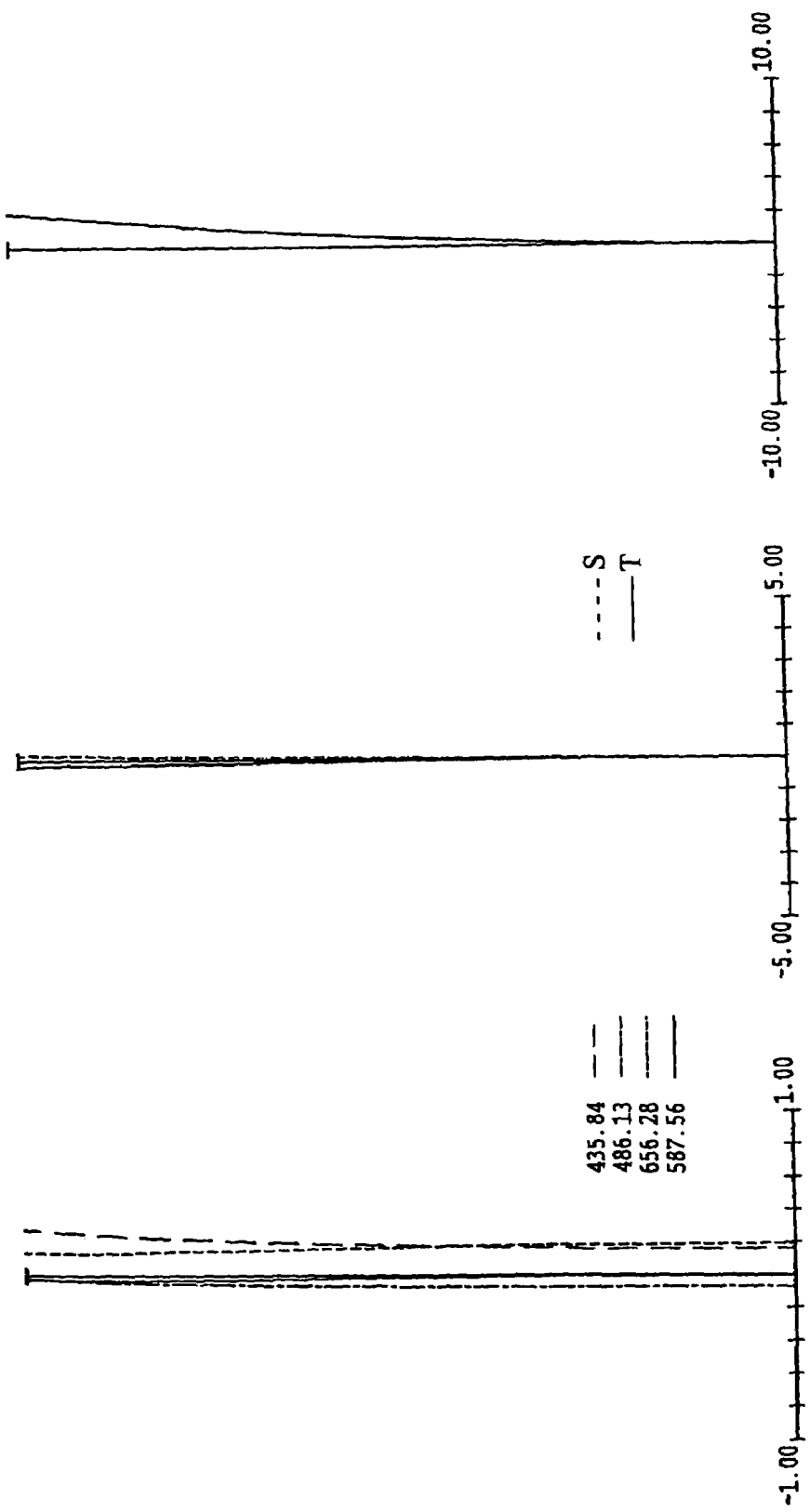
FIGS. 17(a)–17(c) show various aberrations that occur in the light flux subsequent to the afocal relay system 33 when adopting the lens construction shown in FIG. 16.

FIG. 16 shows a cross-sectional view of the still picture pupil relay lens for use with a digital still camera according to the above construction, and FIGS. 17(a)–17(c) show the spherical aberration (in mm) at various wavelengths (in nm), the astigmatism (in mm) in the sagittal S and tangential T image planes, and the distortion (in %), respectively, generated by the optical system from just after the image rotator to the final image surface (i.e., the image surface of the image detecting device 15). In calculating these aberrations, the image taking lens of the digital camera, which corresponds to the image formation optical system 17 in FIG. 1 (i.e., the image taking lens of the digital camera) is assumed to be an ideal lens having a focal length of 100 mm. The term "ideal lens" means that the lens produces no aberrations. Under this assumption, the magnification of the optical system from the intermediate image to the final image surface is 0.55 and just falls on the upper limit of Condition (2).

Table 10 below lists the construction data for the moving picture optical system of Embodiment 2. More specifically, Table 10 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element. Surfaces #1 and #2 are surfaces of the beam splitter 10, surfaces #3 and #4 are surfaces of the lens component 18, surface #5 is the reflection member 19, surface #6 is the second image surface, surfaces #7 and #8 are surfaces of the pupil relay lens 21, and surface #9 is the reflection member 22. Just as with Embodiment 1, in this embodiment the degradation of optical performance of the optical system from the intermediate image to the final image is kept low by creating a difference between the still picture intermediate image formation magnification and the moving picture intermediate formation image magnification.

TABLE 10

(Moving Picture Optical System)

| # | R | D | $N_d$ | $\nu_d$ |
|---|---|---|---|---|
| 1 | ∞ (beam splitter) | 18 | 1.51633 | 64.1 |
| 2 | ∞ | 1 | | |
| 3 | 29.517 | 2.5 | 1.48749 | 70.2 |
| 4 | ∞ | 8.5 | | |
| 5 | ∞ (reflector) | 16.2 | | |
| 6 | (second image) | 5 | | |
| 7 | 47.576 | 3 | 1.48749 | 70.2 |
| 8 | ∞ | 30.8 | | |
| 9 | ∞ (reflector) | | | |

The ratio of the still picture intermediate image height divided by the moving picture intermediate image height is 2.41.

Three examples of the image formation lens 24 attached to this moving picture optical system will now be given. First, Table 11 below lists the construction data of an image formation lens when using a ¼ inch CCD as the moving picture image detecting device. More specifically, Table 11 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element. In the bottom portion of the table is listed the magnification β of the image formation lens.

TABLE 11

(Image Formation Lens for ¼ inch CCD)

| # | R | D | $N_d$ | $\nu_d$ |
|---|---|---|---|---|
| 1 | ∞ (reflector) | 17 | | |
| 2 | 24.425 | 3.2 | 1.7725 | 49.6 |
| 3 | −42.663 | 0.3 | | |
| 4 | 8.915 | 5.8 | 1.497 | 81.5 |
| 5 | −74.324 | 1.4 | 1.801 | 35. |
| 6 | 6.511 | 2.4 | | |
| 7 | −7.269 | 1.4 | 1.64769 | 33.8 |
| 8 | 13.876 | 5.8 | 1.497 | 81.5 |
| 9 | −11.063 | 0.2 | | |
| 10 | 31.68 | 2.6 | 1.788 | 47.4 |
| 11 | −31.68 | 27 | | |
| 12 | (image surface) | | | |

β = −0.67

Figure 18:
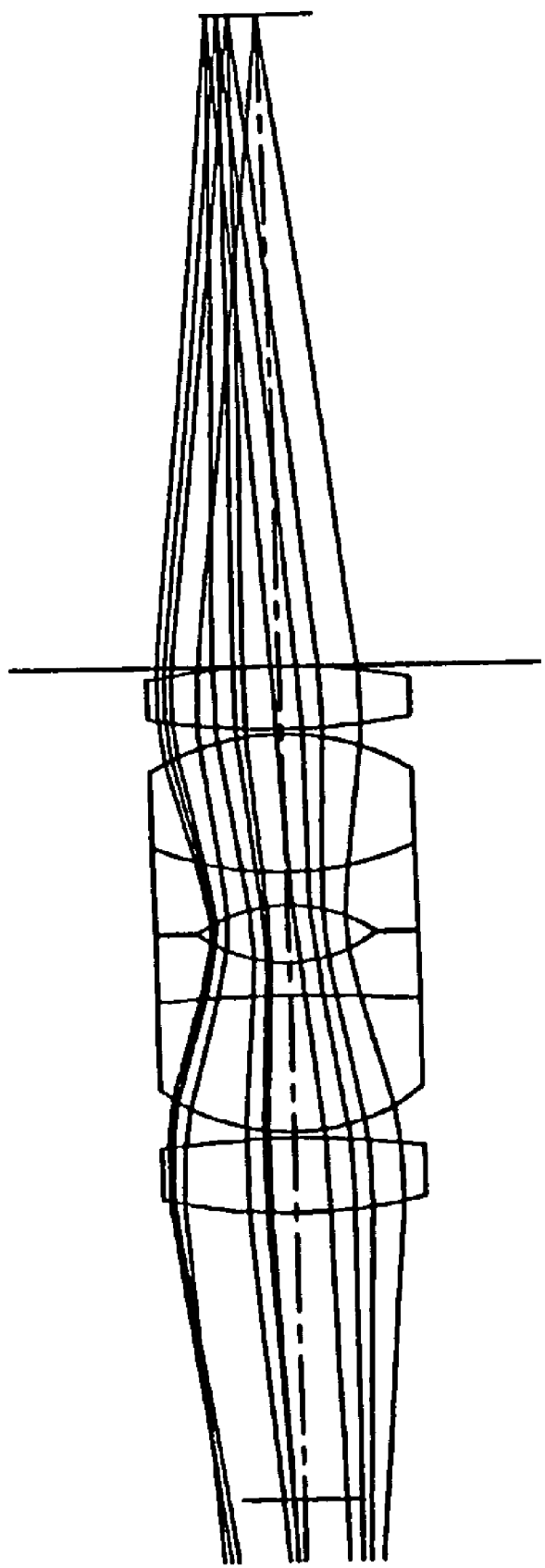
FIG. 18 is a cross-sectional view showing one example of lens construction of the image formation lens 24 suitable when using a ¼ inch CCD as the moving picture image detecting device 25 of Embodiment 2.
Figure 19:
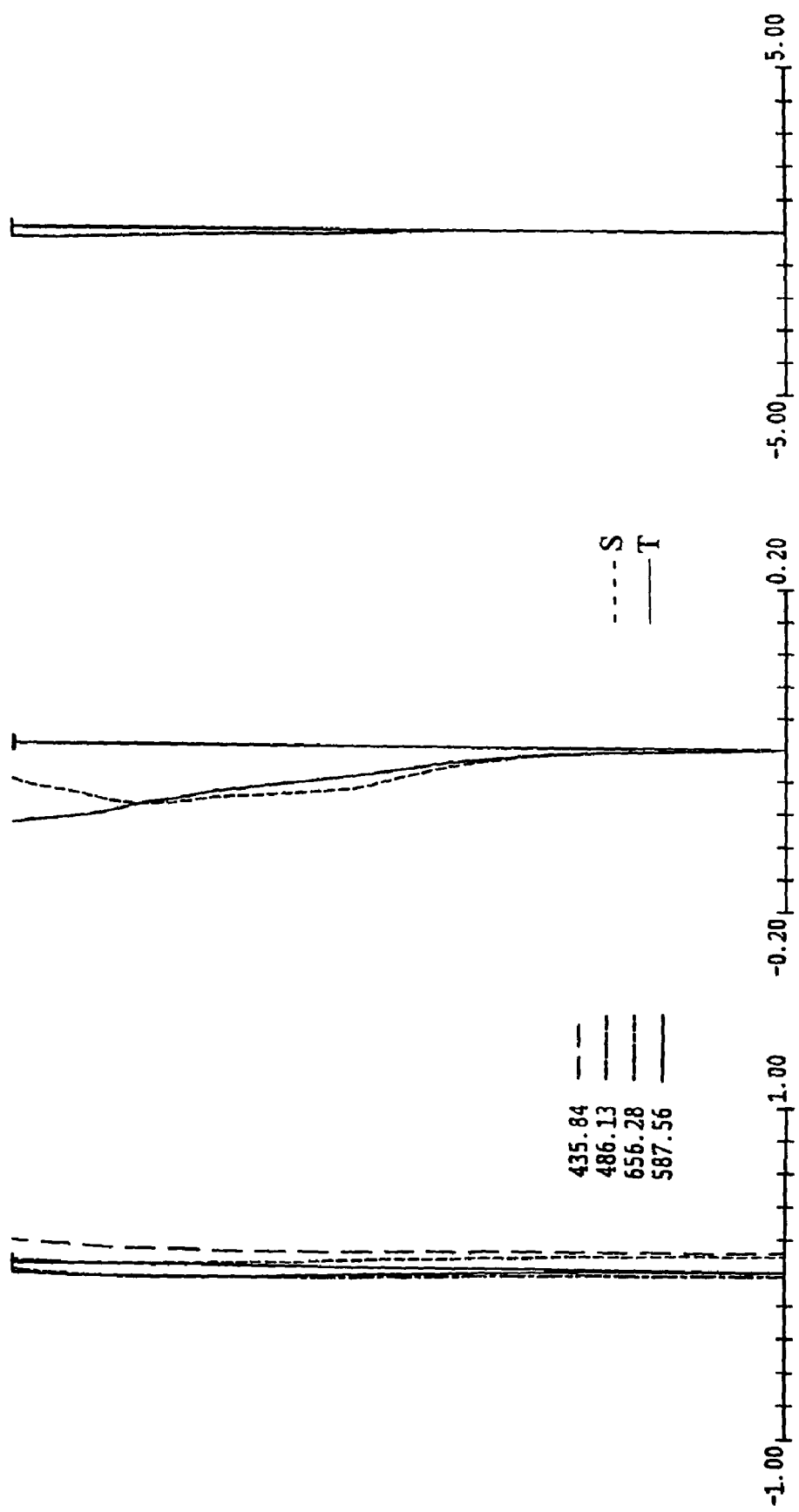
FIGS. 19(a)–19(c) show various aberrations that occur in the light flux subsequent to the afocal relay system 33 when adopting the lens construction shown in FIG. 18.

FIG. 18 is a cross-sectional view of the image formation lens according to the above construction, and FIGS. 19(a)–19(c) show the spherical aberration (in mm) at various wavelengths (in nm), the astigmatism (in mm) in the sagittal S and tangential T image planes, and the distortion (in %), respectively, generated by the optical system of the afocal relay system 33 through the image formation lens. In addition, the glass at surfaces #4 and #8 is anomalous dispersion glass.

Table 12 below lists the construction data of an image formation lens when using a ⅓ inch CCD as the moving picture image detecting device. More specifically, Table 12 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element. In the bottom portion of the table is listed the magnification β of the image formation lens.

TABLE 12

(Image Formation Lens for ⅓ inch CCD)

| # | R | D | $N_d$ | $v_d$ |
|---|---|---|---|---|
| 1 | ∞ (reflector) | 14 | | |
| 2 | 30.228 | 3.4 | 1.8061 | 40.9 |
| 3 | −75.854 | 0.3 | | |
| 4 | 7.826 | 6.2 | 1.497 | 81.5 |
| 5 | −32.053 | 1.4 | 1.741 | 52.6 |
| 6 | 6.331 | 2.4 | | |
| 7 | −9.866 | 1.4 | 1.76182 | 26.5 |
| 8 | 9.866 | 6.4 | 1.497 | 81.5 |
| 9 | −11.838 | 0.2 | | |
| 10 | 21.223 | 3.3 | 1.762 | 40.1 |
| 11 | −59.881 | 38 | | |
| 12 | (image surface) | | | |

β = −0.895

Figure 20:
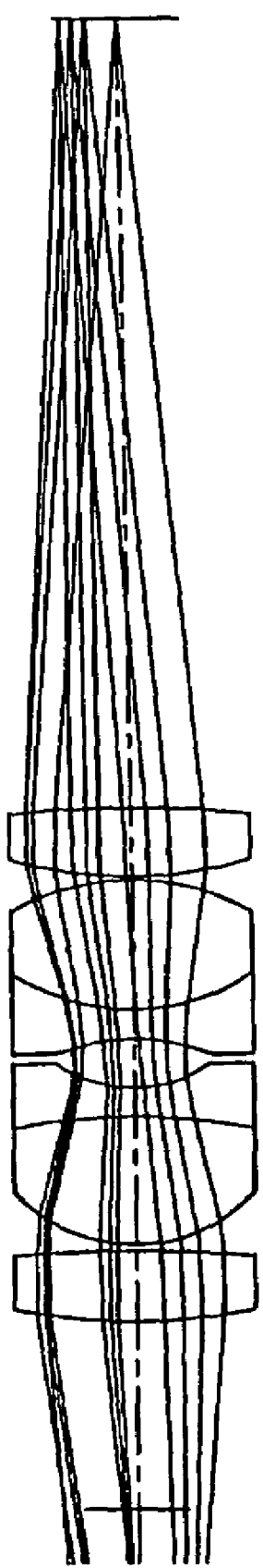
FIG. 20 is a cross-sectional view showing one example of lens construction of the image formation lens 24 suitable when using a ⅓ inch CCD as the moving picture image detecting device 25 in Embodiment 2.
Figure 21:
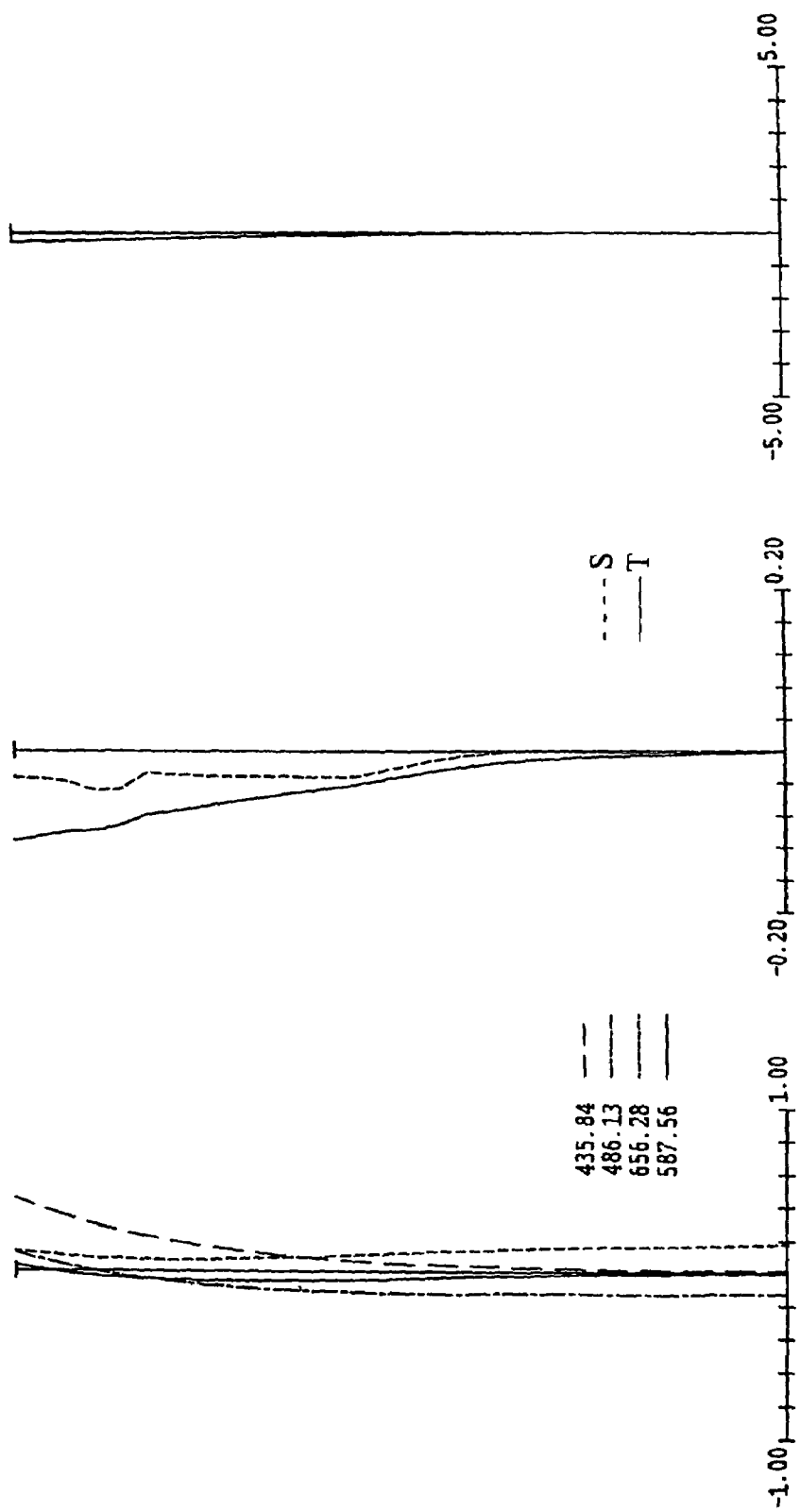
FIGS. 21(a)–21(c) show various aberrations that occur in the light flux subsequent to the afocal relay system 33 when adopting the lens construction shown in FIG. 20.

FIG. 20 is a cross-sectional view of the image formation lens according to the above construction, and FIGS. 21(a)–21(c) show the spherical aberration (in mm) at various wavelengths (in nm), the astigmatism (in mm) in the sagittal S and tangential T image planes, and the distortion (in %), respectively, generated by the optical system of the afocal relay system 33 through the image formation lens. Also in this case, the glass at surfaces #4 and #8 is anomalous dispersion glass.

For the present embodiment, despite there being one additional intermediate relay image as compared to the single relay image of Embodiment 1, the spherical aberration and astigmatism are substantially the same as for Embodiment 1. In addition, as noted above, two lens elements within the adapter lens use anomalous dispersion glass. This anomalous dispersion glass is different from common glasses in that it has a significant partial dispersion ratio. In addition, with the difference in the partial dispersion ratio defined according to Equations (1)–(3) below, efficacy is obtained when $\Delta\theta gF \geq 0.01$ and becomes remarkable at $\Delta\theta gF \geq 0.025$:

$\upsilon_d = (N_d - 1)/(N_F - N_C)$   Equation (1)

$\theta_{gF} = (N_g - N_F)/(N_F - N_C)$   Equation (2)

$\Delta\theta_{gF} = \theta_{gF} + 0.00162\upsilon_d - 0.6416$   Equation (3)

where
 $\upsilon_d$ is the Abbe number at the d-line,
 $N_d$ is the refractive index at the d-line,
 $N_F$ is the refractive index at the F-line,
 $N_C$ is the refractive index at the C-line,
 $\theta_{gF}$ is the partial dispersion ratio,
 $N_g$ is the refractive index at the g-line, and
 $\Delta\theta_{gF}$ is the difference in partial dispersion ratio.

Figure 12:
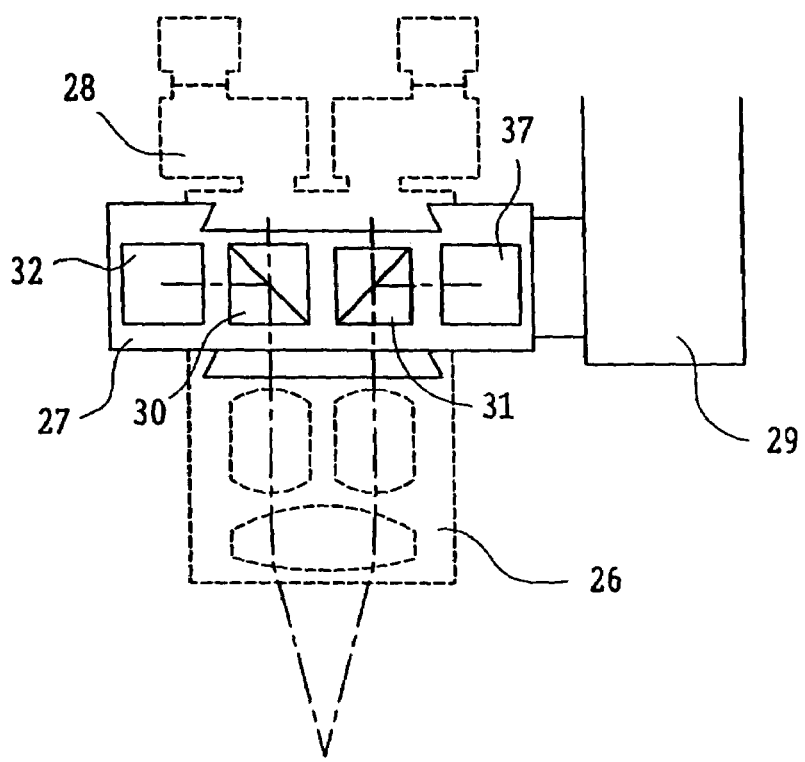
FIG. 12 is a front view of a portion of the optical system of Embodiment 2 and illustrates mainly the beam splitter for the photographic apparatus.
Figure 13:
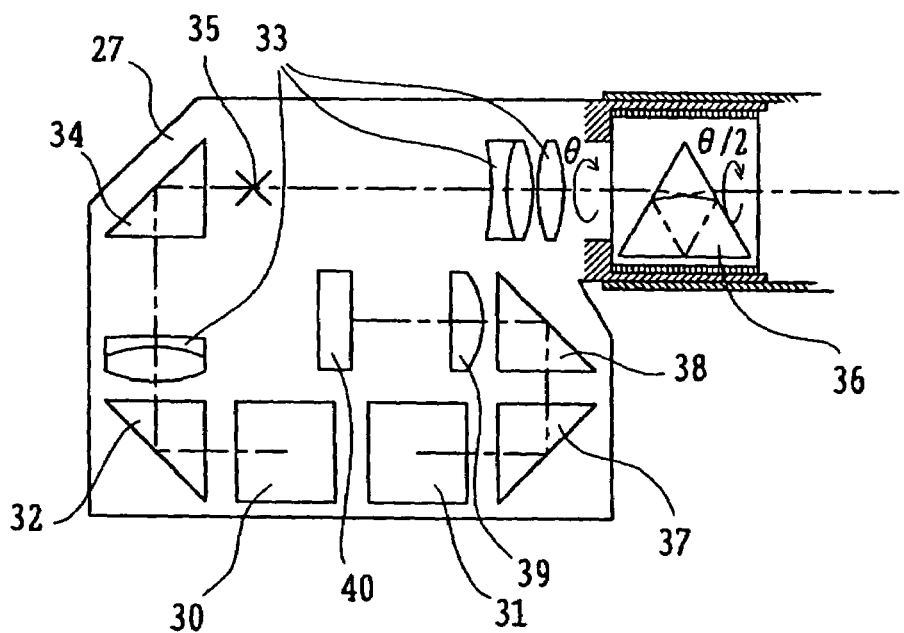
FIG. 13 is a top view of some of the optical system components shown in FIG. 12.

Referring to FIGS. 12 and 13, the optical path to the right side of the beam splitting component 27 will be explained. Here, an optical system is arranged for superimposing images of the monitor 40 on the observation image. The light flux from the monitor 40 is substantially collimated by the collimator lens 39, is directed (i.e., lead) by the reflection members 37 and 38, and is then synthesized using the beam splitter element 31. This enables a still picture or a moving picture photographed by the photographic apparatus or various data displayed on the monitor 40 to be observed through the eyepiece lenses. In the case of a surgical microscope, a surgeon can better see and understand the surgical area and failures can be reduced by overlapping images so as to form a three-dimensional image created from both CT and MRI data that is photographed in advance. Furthermore, when the direct object image is too bright and thus difficult to observe, a diaphragm stop can be used and the brightness of an observation image versus the image on the monitor 40 can be adjusted by adjusting the diameter of the diaphragm stop positioned on the object side of the beam splitting element 31. In addition, when it is unnecessary to overlap these images with a direct observation image, a shutter should be used instead of a diaphragm, and the light flux of the direct observation image should be cut off. In that case, the observer can observe the image on the monitor 40 using one eye.

The binocular lens tube 28 may have other functions for various purposes, such as when two observers want to observe by facing each other, or it can be constructed so that various kinds of binocular lens tubes can be interchanged. In addition, if the microscope body housing the beam splitting component 27 and the microscope body housing an objective lens and a zooming optical system are made to be detachable, the optical system of the microscope body can be freely selected according to cost or purpose, and customizing of microscopes can be achieved.

Table 13 below lists the construction data of an additional example of an image formation lens 24. More specifically, Table 13 lists the surface number #, in order from the object side, the radius of curvature R of each surface, the on-axis spacing D between surfaces, as well as the index of refraction $N_d$ and the Abbe number $\upsilon_d$ (both measured relative to the d-line) of each optical element. In the bottom portion of the table is listed the magnification β of the image formation lens 24.

TABLE 13

(Image Formation Lens)

| # | R | D | $N_d$ | $v_d$ |
|---|---|---|---|---|
| 1 | ∞ (reflector) | 14 | | |
| 2 | 15.924 | 4.2 | 1.72 | 43.7 |
| 3 | −57.572 | 0.2 | | |
| 4 | 7.646 | 6.2 | 1.4388 | 95 |
| 5 | −17.548 | 1.9 | 1.7847 | 26.3 |
| 6 | 5.27 | 1.9 | | |
| 7 | −6.167 | 2 | 1.801 | 35 |
| 8 | 10.693 | 5.6 | 1.4388 | 95 |
| 9 | −10.693 | 0.2 | | |
| 10 | 34.287 | 3.7 | 1.7015 | 41.2 |
| 11 | −17.402 | 50 | | |
| 12 | third image (i.e., image detecting surface) | | | |

β = −1.305

Figure 22:
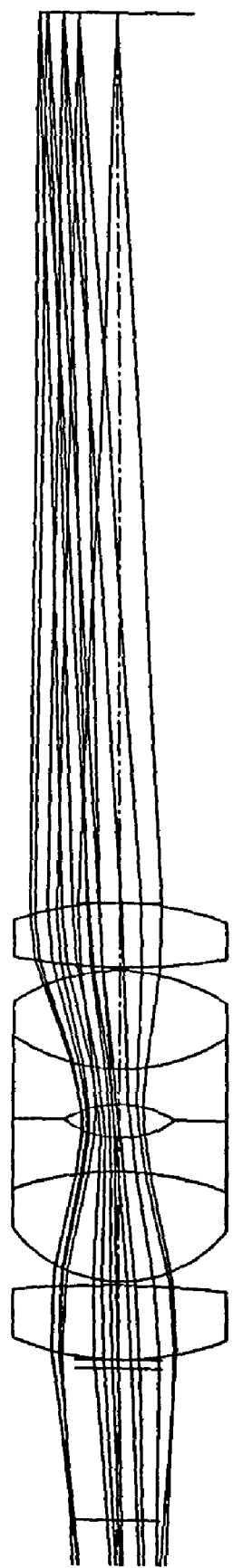
FIG. 22 is a cross-sectional view of an additional example of a moving picture optical system according to the second embodiment.
Figure 23C:
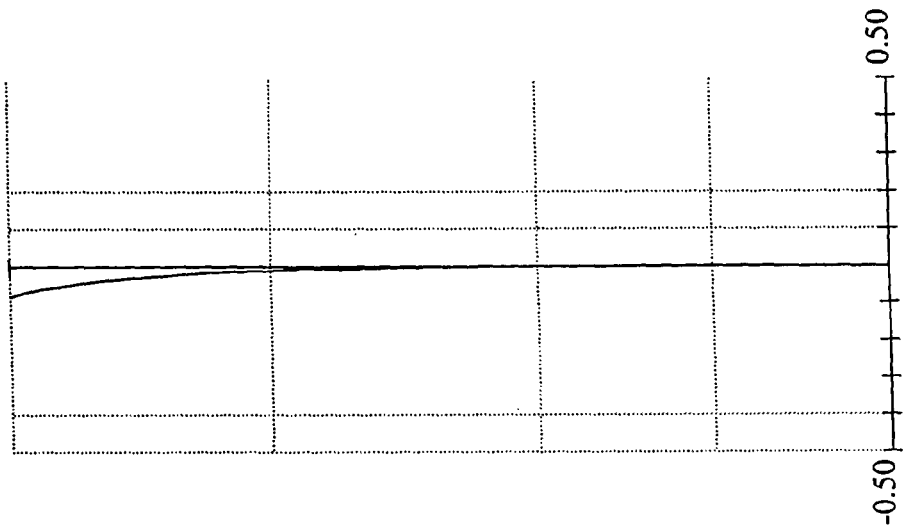
FIGS. 23(a)–23(c) show various aberrations that occur in the light flux subsequent to the afocal relay system 33 when adopting the lens construction shown in FIG. 22.
Figure 23B:
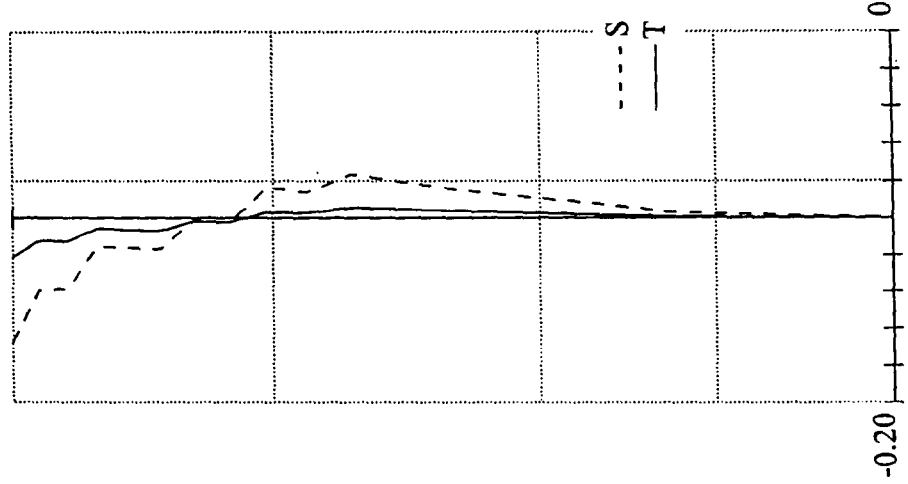
Figure 23A:
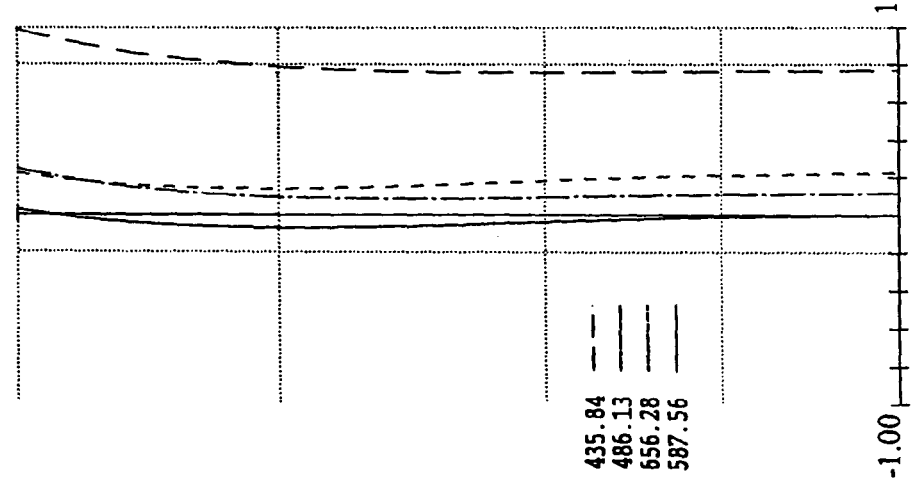

FIG. 22 is a cross-sectional view of the above, additional example, of an image formation lens 24 according to the second embodiment;

FIGS. 23(a)–23(c) show the spherical aberration (in mm) at various wavelengths (in nm), the astigmatism (in mm) in the sagittal S and tangential T image planes, and the distortion (in %), respectively, generated by the optical system of the afocal relay system 33 through the image formation lens 24 shown in FIG. 22. Also in this case, the glass at surfaces #4 and #8 is anomalous dispersion glass.

Embodiment 3

Figure 24:
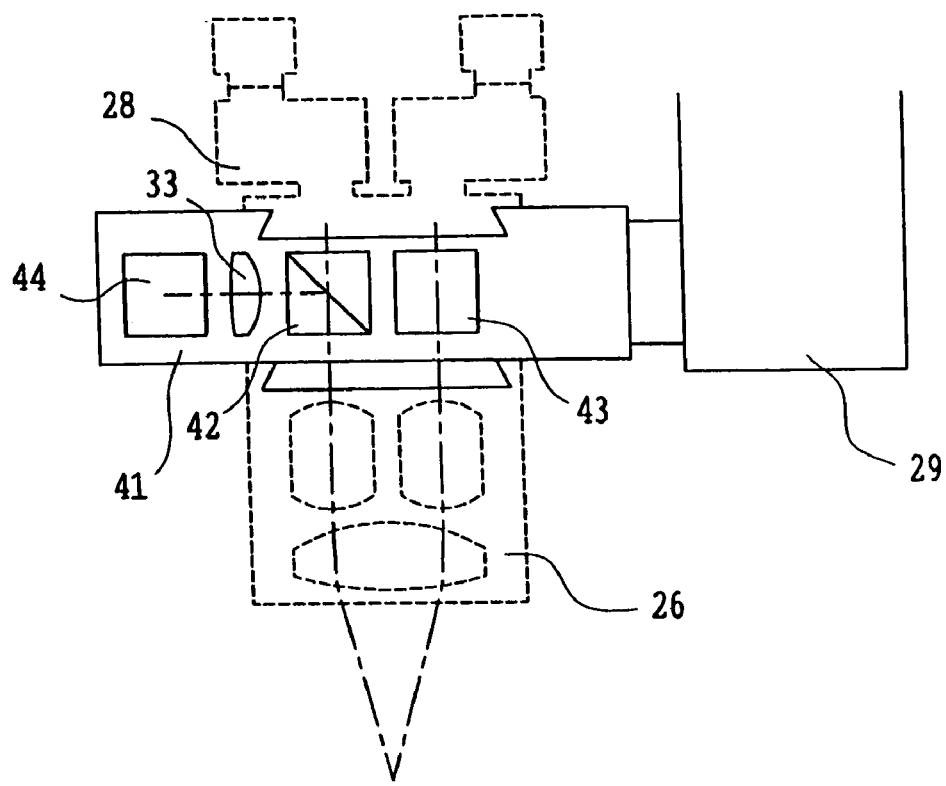
FIG. 24 is a front view of a portion of the optical system of Embodiment 3 and illustrates mainly the beam splitter for the photographic apparatus.
Figure 25:
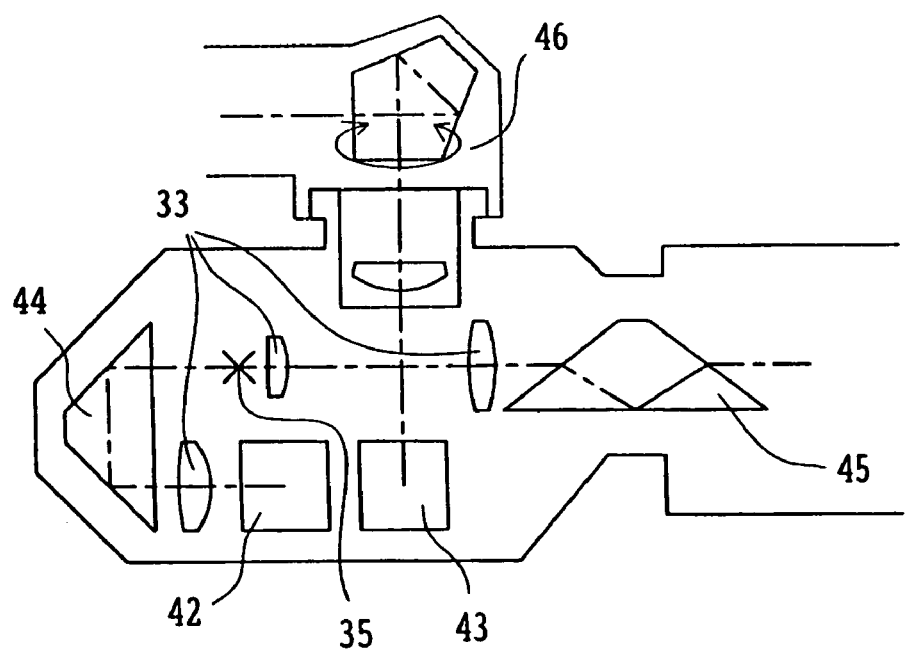
FIG. 25 is a top view of some of the optical system components shown in FIG. 24.
Figure 26:
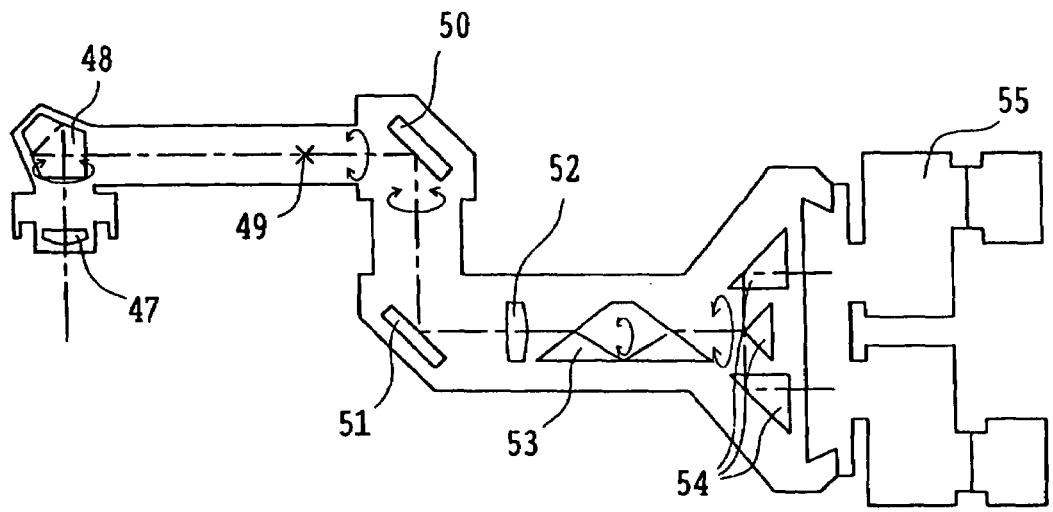
FIG. 26 is a top view of the optical system that is provided for a second observer in Embodiment 3.

FIGS. 24 through FIG. 26 relate to Embodiment 3. FIG. 24 is a front view of the present Embodiment, and FIG. 25 is a top view of FIG. 24. The construction of the described microscope optical system in the aforementioned second Embodiment is suitable for observation by one person or two people facing each other. However, the present Embodiment is made so that an observer can observe facing at a right angle relative to the direction that the other observer observes. In addition, the same numerals are used for those parts that are not substantially different from those in Embodiment 2.

In FIG. 24, the light flux from the observed object is substantially collimated by the objective lens and the zooming lens within the microscope body 26, and is emitted to the beam splitting component 41. The light flux is then split into three directions by the beam splitting component 41. First, the light flux that passes through the left-side beam splitter 42 and the right-side beam splitter 43 enters into the binocular lens tube 28 before image formation. An image rotator allows this light flux to be observed by the eyepiece lenses with the images in a proper orientation. The light flux reflected by the left-side beam splitter 42 enters into the afocal relay system 33 that forms an image at the relay system image point 35 and relays the pupil of the stereoscopic microscope to the vicinity of the image rotator 45, just as in Embodiment 2. Also, in the present embodiment, the reflection member 44 is arranged inside the optical path instead of using the reflection members 32 and 34 as in Embodiment 2.

The image rotator 45 as shown in FIG. 25 is arranged at the connecting part with the arm 29. The image rotator 45 is rotated similar in manner to the image rotator 36 of Embodiment 2 so as to correct for image rotation. However, a dove prism is used in the image rotator 45. Such a prism has the ability to reduce the surface area in an orthogonal direction in relation to the optical axis of the prism. However, on the other hand, there is a drawback in that the length of the dove prism in the direction of the optical axis tends to become longer. This can be countered by making the refractive index higher; however, some degree of coloring may occur. Accordingly, a particular kind of image rotator needs to be selected according to the type of use of the microscope. The image rotator 36 of Embodiment 2 is always acceptable to use.

The light flux reflected by the right-side beam splitter 43 is reflected in a direction away from the observer where it enters into a lateral view scope 46 and crosses at right angles to the optical axis of the afocal relay system 33, and enters into a lateral view scope 46, as shown in FIG. 25. There are lateral view scopes for use with a single eye and those that allow viewing with both eyes. In the present embodiment, a lateral view scope is provided which enables both eyes to observe a three-dimensional image having some parallax as a result of pupil splitting.

The lateral view scope will now be described with reference to FIG. 26. First, an image formation lens 47 forms an image at an image point 49 using the afocal light flux that exits from the right-side beam splitting element 43 (FIG. 25). The light flux which forms an image at the image point 49 is substantially collimated by a collimator lens 52, and then passes through an image rotator 53. This image rotator 53 is for freely changing the direction of an observed image by way of an observer rotating the image rotator. The light flux emitted from the image rotator 53 is split with pupil splitting components 54 which direct the two split light fluxes into the left and right optical systems of a binocular lens tube 55. In this manner, an afocal relay system, which is formed of the image formation lens 47 and the collimator lens 52, relays the pupil of the observation system (which is formed of the microscope body 26, the beam splitting component 41, and the binocular lens tube 28) to the vicinity where the light flux of the pupil is split.

Further, reflecting members 48, 50 and 51 are arranged between the right-side beam splitting element 43 and the collimator lens 52. In addition, the incident light optical axis of each of the reflecting members 48, 50, and 51 is made to be the rotation axis for each of the reflecting members 48, 50 and 51, and the optical system on the output side of each of these reflecting members can be rotated as a single unit. For this reason, when the optical systems subsequent to the reflecting member 48 are rotated as a single unit, the position of a person observing through the binocular lens tube 55 can be moved to either the right side or to the left side of another person who observes through the binocular lens tube 28. FIG. 25 illustrates the case of the person viewing with the binocular lens tube 55 being at the left side, and FIG. 26 illustrates the case of the person viewing with the binocular lens tube 55 being at the right side.

When the optical systems subsequent to the reflecting members 50 and 51 are rotated, an observation direction or position can be changed. In addition, rotating the pupil splitting component 54 and the subsequent optical systems as a single unit in relation to the rotation axis (thereby enabling adjustment of the left and right pupil positions) makes observations easier. For example, if the binocular lens tube 55 is a variable tilt angle lens tube, then the difference in observation positions due to changing the viewing tilt angle becomes easier to correct. The rotation of the observed image by each rotation described above can be easily adjusted by the observer simply rotating the image rotator 53. The number of reflections at the reflecting members 48, 50 and 52 must be adjusted so that the total number of reflections from the microscope body 26 to the lateral view scope 46 (including the lens tube 55, if needed) becomes an even number. In this way, the creation and viewing of a mirror image can be prevented.

Having a construction as described above enables the lateral view scope 46 to be less of an obstruction as compared to the case where it is attached to the side of a microscope body, and an observer who observes through the binocular lens tube 28 can work more easily. In addition, the position of the lateral view scope can easily be changed to either the left side or the right side.

Embodiment 4

Figure 27:
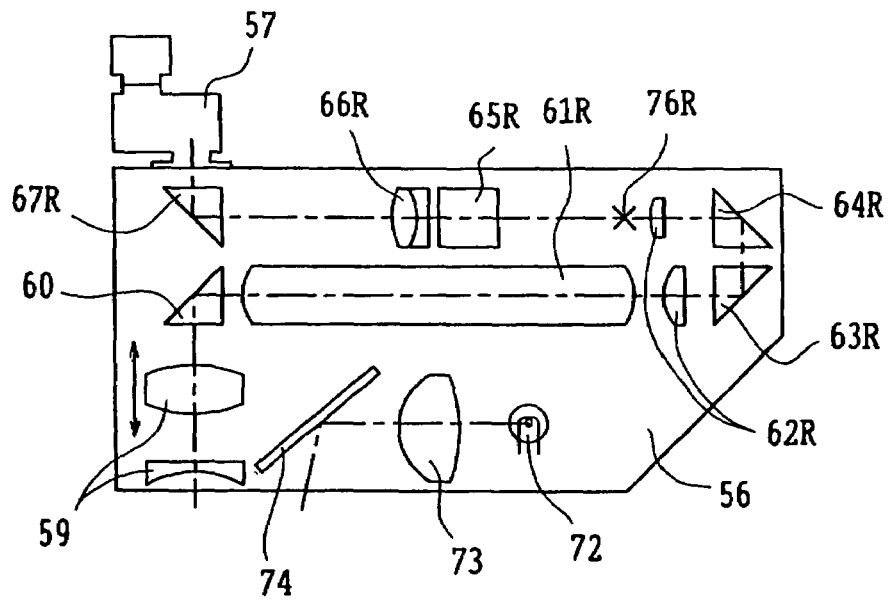
FIG. 27 is a side view of some of the components in the optical system of Embodiment 4 and illustrates mainly the optical system within a stereoscopic microscope body.
Figure 28:
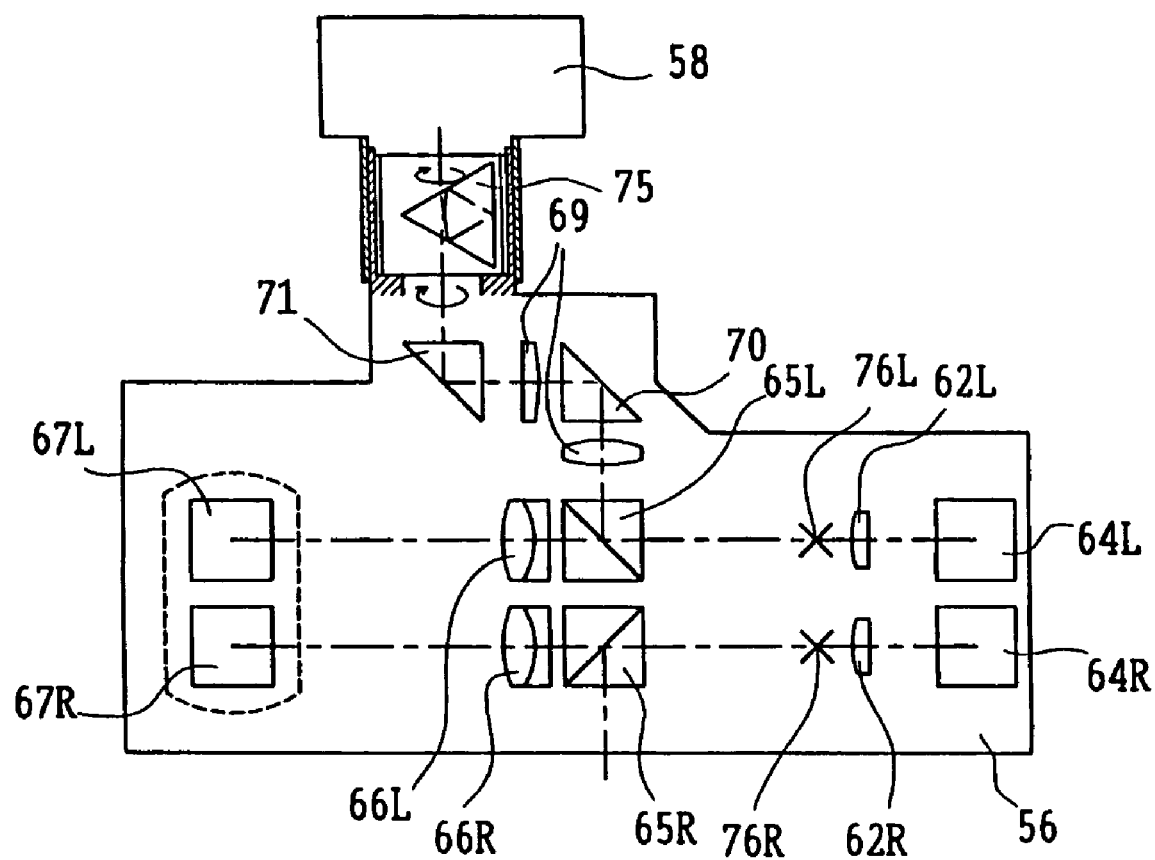
FIG. 28 is a top view of some of the components shown in FIG. 27.

FIGS. 27 and 28 relate to Embodiment 4. There are great demands for increasing the zooming ratio and enabling focal adjustments without moving the stereoscopic microscope body. However, in order to comply with these demands, the zooming system and the objective lens tend to become longer, the distance between an observed object and the observation position tends to increase, and it becomes harder to perform operations on the observed object while observing. The present embodiment is intended to satisfy these demands without making it harder to perform operations on the observed object. FIG. 27 is a side view of the optical system of the present embodiment observed from the right side of the observer in an observation state, and FIG. 28 illustrates a top view of the optical system of the present embodiment.

In the following discussion, items not visible in the drawing by reason of being obscured will be labeled in parenthesis. Referring to FIG. 27, the microscope body 56 of the present embodiment includes objective lens components 59, a reflecting member 60, afocal zooming optical systems (61L) 61R, image formation lenses (62L) 62R, reflecting members (63L) 63R, (64L) 64R, beam splitters (65L) 65R, collimator lenses (66L) 66R, and reflecting members (67L) 67R. A binocular lens tube 57 is attached at the output side of the reflecting members (67L) 67R. The microscope body also includes a light source 72 of an illumination system, an illumination lens 73, and an reflection member 74.

Referring to FIG. 28, the microscope body also includes collimator lenses 69, 69 and reflecting members 70 and 71 positioned in the optical path that is split off by the reflecting member 65L. The optical systems housed in the arm 2 (FIG. 1) and the photographic components in the present embodiment are provided in the arm 58 (FIG. 28) that is connected to the microscope body 56 as in previously discussed embodiments. Moreover, an image rotator 75 is arranged in a connecting part between the microscope body 56 and the arm 58, and image orientation is corrected by rotating the image rotator as in previously discussed embodiments.

Referring again to FIG. 27, the objective lens components 59 change the focal position by moving one of the lens components (the entire objective lens may be moved in the case of a Greenough-type stereoscopic microscope). The light flux exiting the objective lens components 59 is substantially collimated. This light flux is then reflected by the reflecting member 60 and enters into the afocal zooming optical systems (61L) 61R, after which it exits as substantially collimated light. When the reflecting member 60 is not provided, an optical path from the objective lens components 59 to the binocular lens tube 57 becomes excessive in the vertical direction. However, in the present embodiment, such an inconvenience is avoided.

On the other hand, when the reflecting member 60 is provided, the exit positions of light from the afocal zooming optical systems (61L) 61R are separated and the collimated light fluxes spread. This causes eclipsing of the light fluxes to occur and thus prevents a portion of the light flux from being taken into the binocular lens tube 57, which is limited in its lens diameter due to having a pair of left and right optical systems. In order to avoid this problem, the afocal relay system having relay system image points (76L) 76R includes image formation lenses (62L) 62R and collimator lenses (66L) 66R, and it relays a pupil (or an estimated position of a pupil) that is determined by the afocal zooming optical systems (61L) 61R to a pupil of the lens tube 57 (or an estimated position of the pupil). By doing this, the distance between an eye position of an observer and an observed object can be minimized. In addition, the microscope body 56 is formed with a shape so as to protrude only in the direction of an observer, so there is no problem in performing an operation on an observed object.

In observation optical systems of this type, an erecting optical system is not necessary in the binocular lens tube 57 (because the images are rotated 180° by reason of the image formation). However, when the binocular lens tube 57 is expected to be used with other microscopes, the microscope body combined with the binocular lens tube 57 should perform an image erecting function so that the images can be erected within the microscope body. In such a case, an erecting optical system may be constructed using reflecting surfaces within the microscope body 56, or the number of images formed may be limited to even numbers.

When there is a relay system in the observation optical systems within the microscope body 56, the relay system logically can be made in common with the pupil optical system in order to miniaturize the size of the image rotator, as described above for Embodiments 2 and 3. However, common usage is difficult to achieve because of the difference of the optical paths between the binocular lens tube 57 and the image rotator 75. The practical way is to change collimator lenses which collimate the light flux subsequent to the relay system image points (76L) 76R, to other lenses. Accordingly, in the present embodiment a beam splitter 65L is arranged between the relay system image point 76L and the observation system collimator lens 66L, the photographic apparatus collimator lens 69 is arranged at the reflection side of the beam splitter 65, and a pupil of the observation system is relayed to the vicinity of the image rotator 75. In addition, by using the reflecting members 70 and 71, the position of the stereoscopic microscope is set so that the center of gravity of the stereoscopic microscope (microscope body 56 and binocular lens tube 57) lies on an extension of the rotation axis of the image rotator 75.

In this manner, in the present embodiment, the relay system image points 76L and 76R are not within the afocal relay system, but they are nearby. This is effective for aberration correction of the relay system, and is especially effective when the length of the relay system is short. In addition, the photographic system collimator lenses 69 are formed of two separated lens components, and by having two lens components separated, substantially collimated light can be achieved by moving one lens group in the direction of the optical axis and adjustment of the image center position can be achieved by moving the other lens group within a plane orthogonal to the optical axis.

In the present embodiment the illumination system is within the stereoscopic microscope body. This illumination system gathers light from a light source 72 and projects the light toward the vicinity of an observed object with an illumination lens 73. The formation of shadows on an observed object should be avoided as much as possible, and thus the illuminating light is nearly aligned with the light flux of the observation system by use of an reflection member 74. In addition, a light guide that is made of an optical fiber bundle can be used with a light source so as to avoid trapping heat within a surgical drape used to isolate the microscope when the microscope is used for surgery. In that case, the light source and the entrance end of the light guide are placed outside the drape and the exit end of the light guide is placed where the light source is usually placed.

Furthermore, the lateral view scope, as shown in FIG. 26, can be attached at the reflection side of the beam splitter 65R in the present embodiment. In addition, an optical system for superimposing a displayed image on a monitor onto an observation image (such as an optical system composed of the reflection member 37 through the monitor 40 in FIG. 13) can be attached on the reflection side of the beam splitter 65R in the case where the beam splitter 65R is placed in a reverse direction and the partially reflecting surface thereof becomes almost parallel to the partially reflecting surface of the beam splitter 65L. By providing a beam splitter in the space between the observation system collimator lenses 66L and 66R and the reflection members 67L and 67R, and also by providing another binocular tube in the optical path divided by the beam splitter, it is possible for two observers to observe while facing each other without lengthening the straight line distance from an observed object to the eye of an observer.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A photographic apparatus for use with a stereoscopic microscope having at least two observation light paths for observing at least two images having parallax, said photographic apparatus using a light flux that has been split from one of the observation light paths, said photographic apparatus comprising:
   at least two image detecting elements, each having an image receiving surface;
   a connecting part that is connectable to the stereoscopic microscope;
   a beam splitter that is positioned in an optical path between the connecting part and the at least two image receiving surfaces;
   an image relay optical system that is positioned in each light flux following said beam splitter, each image relay optical system relaying an intermediate image that is formed in each light flux following said beam splitter to a respective one of the at least two image receiving surfaces; and
   at least one lens that is located between the connecting part and the beam splitter and that serves to form said intermediate images.

2. The photographic apparatus according to claim 1, wherein the following Condition (1) is satisfied in each optical path:

$$-0.45 \geq \beta \geq -4 \qquad \text{Condition (1)}$$

where
   $\beta$ is a magnification, defined as the ratio of the image size at an image receiving surface of the photographic apparatus divided by the image size of the respective intermediate image.

3. The photographic apparatus according to claim 1, wherein the following Condition (2) is satisfied in the photographic optical path:

$$-0.55 \geq \beta \geq -3 \qquad \text{Condition (2)}$$

where
   $\beta$ is a magnification, defined as the ratio of the image size at an image receiving surface of the photographic apparatus divided by the image size of the respective intermediate image.

4. A photographic apparatus for use with a stereoscopic microscope having at least two observation light paths for observing at least two images having parallax and for use with at least two image detecting devices, said photographic apparatus using a light flux that has been split from one of the observation light paths, said photographic apparatus comprising:
   at least two image surfaces, at each of which an image surface of the image detecting element is placed when the image detecting element is used with the photographing apparatus;
   a connecting part that may be connected to the stereoscopic microscope;
   a beam splitter that is positioned in an optical path between the connecting part and the at least two image surfaces;
   an image relay optical system that is positioned in each light flux following said beam splitter, each image relay optical system relaying an intermediate image that is formed in each light flux following said beam splitter to a respective one of the at least two image surfaces; and
   at least one lens that is located between the connecting part and the beam splitter and that serves to form said intermediate images.

5. In combination, a stereoscopic microscope and a photographic apparatus:
   the stereoscopic microscope including
      an objective lens for substantially collimating a light flux from an object;
      two afocal zooming optical systems which receive light from the objective lens;
      a first beam splitter for splitting the light flux that exits one of the afocal zooming optical systems into two light fluxes, one of which is directed to an observation system for an observer; and
      a binocular tube optical system for forming two images having parallax of an object using the light fluxes that have passed through the afocal zooming optical systems, said binocular tube optical system including eyepiece optical systems; and
   a photographic apparatus, which receives one of the light fluxes split by the first beam splitter, and onto which at least two image detecting devices are attachable, said photographic apparatus including
      a second beam splitter for splitting the light flux in the photographic apparatus into at least two light fluxes;
      an optical system that forms an intermediate image in each divided light path between the second beam splitter and each image detecting device, and
      an image relay optical system for relaying each intermediate image to a respective image receiving surface of each image detecting device.

6. The combination according to claim 5, wherein the following Condition (1) is satisfied in each divided light path of the photographic system:

$$-0.45 \geq \beta - 4 \qquad \text{Condition (1)}$$

where
   $\beta$ is a magnification, defined as the ratio of the image size at an image receiving surface of the photographic apparatus divided by the image size of the respective intermediate image.

7. The combination according to claim 5, wherein:
   each image relay optical system includes a pupil relay lens unit and an image formation lens unit;
   each of the image formation lens units includes a Gaussian-type lens system that has two concave surfaces which face each other;
   exit pupils of the image formation lens units are positioned substantially at infinity; and
   each of the Gaussian-type lens systems includes a negative lens having a concave surface and a positive lens that is made of an anomalous dispersion optical material that is placed in proximity to the negative lens or is cemented to the negative lens.

8. The combination according to claim 5, wherein:
   an image rotator is arranged in the photographic apparatus for rotating an image to be photographed; and
   a pupil relay optical system is arranged on the object side of the image rotator; wherein the pupil relay optical system forms only a single intermediate image and relays an exit pupil of the stereoscopic microscope to a position on, or in the vicinity of, the image rotator.

9. The combination according to claim 8, wherein:
the afocal zooming optical systems each includes an image relay optical system and a zoom lens part; and
a part of the pupil relay optical system and a part of the image relay optical system are shared so that one or more components are common to each.

10. The combination according to claim 8, wherein an optical system that is arranged along an optical path from an image rotator to an image surface is housed within an arm that is adapted for connecting the stereoscopic microscope to a platform.

11. A photographic apparatus for use with a stereoscopic microscope having at least two observation light paths for observing at least two images having parallax, said photographic apparatus using a light flux that has been split from one of the observation light paths, said photographic apparatus comprising:
at least two image detecting elements, each having an image receiving surface;
a connecting part that is connectable to the stereoscopic microscope;
a beam splitter that is positioned in an optical path between the connecting part and the at least two image receiving surfaces; and
an image relay optical system that is positioned in each light flux following said beam splitter, each image relay optical system relaying an intermediate image that is formed in each light flux following said beam splitter to a respective one of the at least two image receiving surfaces, wherein:
each image relay optical system includes a pupil relay lens unit and an image formation lens unit;
each of the image formation lens units includes a Gaussian-type lens system that has two concave surfaces that face each other; and
the pupil relay lens unit and the image formation lens unit are so arranged that an exit pupil of the image formation lens unit is positioned substantially at infinity.

12. The photographic apparatus according to claim 11, wherein said Gaussian-type lens system comprises a negative lens having a concave surface and a positive lens made of anomalous dispersion optical material that is placed in proximity to the negative lens or is cemented to the negative lens.

13. A photographic apparatus for use with a stereoscopic microscope having at least two observation light paths for observing at least two images having parallax and for use with at least two image detecting devices, said photographic apparatus using a light flux that has been split from one of the observation light paths, said photographic apparatus comprising:
at least two image surfaces, at each of which an image surface of the image detecting element is placed when the image detecting element is used with the photographing apparatus;
a connecting part that may be connected to the stereoscopic microscope;
a beam splitter that is positioned in an optical path between the connecting part and the at least two image surfaces; and
an image relay optical system that is positioned in each light flux following said beam splitter, each image relay optical system relaying an intermediate image that is formed in each light flux following said beam splitter to a respective one of the at least two image surfaces;
in combination with
a stereoscopic microscope, wherein the center of gravity of the stereoscopic microscope is arranged substantially along the rotation axis of an image rotator.

14. A photographic apparatus for use with a stereoscopic microscope having at least two observation light paths for observing at least two images having parallax, said photographic apparatus using a light flux that has been split from one of the observation light paths, said photographic apparatus comprising:
at least two image detecting elements, each having an image receiving surface;
a connecting part that is connectable to the stereoscopic microscope;
a beam splitter that is positioned in an optical path between the connecting part and the at least two image receiving surfaces; and
an image relay optical system that is positioned in each light flux following said beam splitter, each image relay optical system relaying an intermediate image that is formed in each light flux following said beam splitter to a respective one of the at least two image receiving surfaces, and further comprising:
a stereoscopic microscope, the stereoscopic microscope including a pupil relay optical system that forms only a single intermediate image and relays the pupil of the stereoscopic microscope; and
an image rotator that is arranged on, or in the vicinity of, the relayed pupil.

15. The photographic apparatus according to claim 14, wherein an optical system that is arranged along an optical path from an image rotator to an image surface is housed within an arm that is adapted for connecting the stereoscopic microscope to a platform.

16. A photographic apparatus for use with a stereoscopic microscope having at least two observation light paths for observing at least two images having parallax and for use with at least two image detecting devices, said photographic apparatus using a light flux that has been split from one of the observation light paths, said photographic apparatus comprising:
at least two image surfaces, at each of which an image surface of the image detecting element is placed when the image detecting element is used with the photographing apparatus;
a connecting part that may be connected to the stereoscopic microscope;
a beam splitter that is positioned in an optical path between the connecting part and the at least two image surfaces; and
an image relay optical system that is positioned in each light flux following said beam splitter, each image relay optical system relaying an intermediate image that is formed in each light flux following said beam splitter to a respective one of the at least two image surfaces; wherein
an optical system that is arranged along an optical path from an image rotator to an image surface is housed within an arm that is adapted for connecting the stereoscopic microscope to a platform.

* * * * *